(12) United States Patent
Kato et al.

(10) Patent No.: US 9,319,107 B2
(45) Date of Patent: Apr. 19, 2016

(54) WIRELESS POWER TRANSMISSION SYSTEM

(71) Applicant: MURATA MANUFACTURING CO., LTD., Nagaokakyo-Shi (JP)

(72) Inventors: Kazuya Kato, Nagaokakyo (JP); Kazuaki Higashibata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 498 days.

(21) Appl. No.: 13/871,067

(22) Filed: Apr. 26, 2013

(65) Prior Publication Data

US 2013/0234533 A1    Sep. 12, 2013

Related U.S. Application Data

(63) Continuation of application No. PCT/JP2011/071794, filed on Sep. 26, 2011.

(30) Foreign Application Priority Data

Dec. 24, 2010 (JP) .................. 2010-287011

(51) Int. Cl.
| | |
|---|---|
| *H01F 27/42* | (2006.01) |
| *H04B 5/00* | (2006.01) |
| *H02J 17/00* | (2006.01) |
| *H02J 7/00* | (2006.01) |
| *H01G 5/04* | (2006.01) |
| *H02J 7/02* | (2006.01) |

(52) U.S. Cl.
CPC ............... *H04B 5/0037* (2013.01); *H01G 5/04* (2013.01); *H02J 7/0044* (2013.01); *H02J 17/00* (2013.01); *H02J 7/025* (2013.01)

(58) Field of Classification Search
CPC ......... H02J 17/00; H02J 7/025; H02J 7/0044; H04B 5/0037; H01G 5/04
USPC .......................................... 307/104
See application file for complete search history.

(56) References Cited

U.S. PATENT DOCUMENTS

| | | | |
|---|---|---|---|
| 2009/0302690 A1 | 12/2009 | Kubono et al. | |
| 2011/0163827 A1* | 7/2011 | Kanno | H01G 4/255 333/185 |

(Continued)

FOREIGN PATENT DOCUMENTS

| | | |
|---|---|---|
| FR | 2875649 A1 | 3/2006 |
| JP | 2009-531009 A | 8/2009 |

(Continued)

OTHER PUBLICATIONS

Supplementary European Search Report for European counterpart application No. 11 85 0364, dated Jul. 23, 2014, mail date Sep. 2, 2014.
PCT/JP2011/071794 Written Opinion dated Jul. 12, 2011.

*Primary Examiner* — Jared Fureman
*Assistant Examiner* — Duc M Pham
(74) *Attorney, Agent, or Firm* — Arent Fox LLP

(57) ABSTRACT

A wireless power transmission system that includes a power transmission apparatus including a passive electrode and an active electrode and a power reception apparatus including passive electrodes and active electrode. When the power reception apparatus is longitudinally placed on the power transmission apparatus, the active electrodes are opposed to each other to cause electric power to be transmitted from the power transmission apparatus to the power reception apparatus. A facing area between the active electrodes in lateral placement of the power reception apparatus on the power transmission apparatus is made substantially equal to a facing area between the active electrodes in the longitudinal placement of the power reception apparatus on the power transmission apparatus.

17 Claims, 19 Drawing Sheets

(56) References Cited

U.S. PATENT DOCUMENTS

| | | | |
|---|---|---|---|
| 2012/0146431 A1* | 6/2012 | Ichikawa | H02J 3/00 307/149 |
| 2012/0181980 A1* | 7/2012 | Ichikawa | H02J 7/025 320/108 |
| 2012/0262005 A1 | 10/2012 | Camurati et al. | |

FOREIGN PATENT DOCUMENTS

| | | |
|---|---|---|
| JP | 2009-296857 A | 12/2009 |
| WO | WO-97/14112 A1 | 4/1997 |
| WO | WO-98/01905 A1 | 1/1998 |
| WO | WO-2007-107642 A1 | 9/2007 |
| WO | WO-2010/035879 A1 | 4/2010 |

* cited by examiner

WIRELESS POWER TRANSMISSION SYSTEM

CROSS REFERENCE TO RELATED APPLICATIONS

The present application is a continuation of International application No. PCT/JP2011/071794, filed Sep. 26, 2011, which claims priority to Japanese Patent Application No. 2010-287011, filed Dec. 24, 2010, the entire contents of each of which are incorporated herein by reference.

FIELD OF THE INVENTION

The present invention relates to a wireless power transmission system that transmits electric power from a power transmission apparatus to a power reception apparatus placed on the transmission apparatus.

BACKGROUND OF THE INVENTION

Typical wireless power transmission systems include power transmission systems using magnetic field coupling, which transmit electric power from primary coils in power transmission apparatuses to secondary coils in power reception apparatuses by using the magnetic fields. Since the magnitudes of magnetic fluxes passing through the respective coils have large effects on the electromotive forces in the transmission of the electric power using the magnetic field coupling in such systems, high precision is required for the relative positional relationship between the primary coils and the secondary coils. In addition, it is difficult to reduce the apparatuses in size because of the use of the coils.

In contrast, wireless power transmission systems using electric field coupling, such as the ones disclosed in PTLs 1 and 2, are also known. In such a system, electric power is transmitted from coupling electrodes in the power transmission apparatus to coupling electrodes in the power reception apparatus through the electric field. The relative positional precision required for the coupling electrodes is relatively low in this method and it is possible to reduce the coupling electrodes in size and thickness.

FIG. 1 illustrates the basic configuration of the power transmission system described in PTL 1. This power transmission system is composed of a power transmission apparatus and a power reception apparatus. The power transmission apparatus includes a high-frequency high-voltage generating circuit 1, a passive electrode 2, and an active electrode 3. The power reception apparatus includes a high-frequency high-voltage load circuit 5, a passive electrode 7, and an active electrode 6. The active electrode 3 in the power transmission apparatus is close to the active electrode 6 in the power reception apparatus via a gap 4 to cause the active electrode 3 in the power transmission apparatus to be electrically coupled to the active electrode 6 in the power reception apparatus.

The passive electrode 2 in the power transmission apparatus, the active electrode 3 in the power transmission apparatus, the active electrode 6 in the power reception apparatus, and the passive electrode 7 in the power reception apparatus are arranged so as to be parallel to each other.

In the power transmission system described in PTL 2, the power transmission apparatus includes a first resonant circuit that resonates with an alternating current signal generated by an alternating current signal generator and a feeding electrode. The power reception apparatus includes a power reception electrode that generates an electrical signal, a second resonant circuit that resonates with the electrical signal, a rectifier that generates direct current power from the electrical signal subjected to the resonance, and a circuit load. An active electrode in the power transmission apparatus is provided on the same plane as that of a passive electrode therein. An active electrode and a passive electrode in the power reception apparatus are provided so as to oppose the corresponding active electrode and passive electrode in the power transmission apparatus across a certain space.

FIGS. 18 to 21 in PTL 2 show that the active electrode at the power reception apparatus side is composed of multiple split electrodes and the split electrodes in the power reception apparatus overlapping with first and second active electrodes in the power transmission apparatus when the power reception apparatus is placed on the power transmission apparatus selectively operate as the active electrodes.

PTL 1: Japanese Unexamined Patent Application Publication (Translation of PCT Application) No. 2009-531009
PTL 2: Japanese Unexamined Patent Application Publication No. 2009-296857

SUMMARY OF THE INVENTION

In the power transmission system in PTL 1, the active electrode in the power transmission apparatus is close to the active electrode in the power reception apparatus to form a strong electric field between the electrodes and to increase the capacitance occurring between the passive electrode in the power transmission apparatus and the passive electrode in the power reception apparatus as much as possible. Accordingly, it is necessary to increase the passive electrodes in size. The longitudinal arrangement of the passive electrode in the power transmission unit, the active electrode in the power transmission unit, the active electrode in the power reception unit, and the passive electrode in the power reception unit in a longitudinally narrow space tends to make the stray capacitance excessively large.

Also in the power transmission system in PTL 2, since the active electrode is arranged near the passive electrode on the same plane, the stray capacitance between the electrodes and a circuit board arranged near the active electrode and the passive electrode tends to increase. Accordingly, there are problems in that the degree of coupling is not high and the transmission efficiency is low in both of the power transmission systems.

Against the above problems, it is necessary to provide the electrodes in the power transmission apparatus and the power reception apparatus so that the optimal facing area between the electrodes concerning the degree of electric coupling is achieved in order not to decrease the transmission efficiency. However, in such a case, the degree of freedom of the orientation of placement of the power reception apparatus on the power transmission apparatus can possibly be degraded.

An object of the present invention is to provide a wireless power transmission system having a high degree of freedom of the orientation of placement of the power reception apparatus on the power transmission apparatus without degrading the power transmission efficiency.

Solution to Problem

The present invention provides a wireless power transmission system including a power transmission apparatus including a first electrode and a voltage generating circuit connected to the first electrode; and a power reception apparatus including a second electrode, a voltage step-down circuit connected to the second electrode, and a load circuit that receives a voltage output from the voltage step-down circuit as a source voltage. When the power reception apparatus is placed on the power transmission apparatus in a certain state, the first electrode that opposes the second electrode causes electric power to be transmitted from the power transmission apparatus to the power reception apparatus. A facing area between the first electrode and the second electrode when the power reception apparatus is placed on the power transmission apparatus in a turned state in which the power reception apparatus is turned along an opposing face by substantially 90 degrees from the certain state is substantially equal to a facing area therebetween when the power reception apparatus is placed on the power transmission apparatus in the certain state.

With the above configuration, the facing area between the first and second electrodes when the power reception apparatus is placed on the power transmission apparatus in a certain placement state is substantially equal to the facing area therebetween when the power reception apparatus is placed on the power transmission apparatus in the turned state in which the power reception apparatus is turned from the certain placement state by substantially 90 degrees. For example, when the power reception apparatus is placed on the power transmission apparatus with being set against the power transmission apparatus, the facing area between the first and second electrodes is constant regardless of the longitudinal placement or the lateral placement of the power reception apparatus. The first electrode is the active electrode at the power transmission apparatus side and the second electrode is the active electrode at the power reception apparatus side.

Accordingly, since reduction in the transmission efficiency and the amount of power transmission is not caused by a variation in the facing area between the electrodes depending on the placement state of the power reception apparatus, stable power transmission is available regardless of the placement state of the power reception apparatus. As a result, it is possible to improve the degree of freedom of the orientation of placement of the power reception apparatus on the power transmission apparatus without degrading the power transmission efficiency.

In the wireless power transmission system according to the present invention, it is preferred that one of the first electrode and the second electrode include a strip electrode having a long axis and a short axis, that the other of the first electrode and the second electrode include two electrodes whose central portions are aligned so as to be spaced from each other by the length of the long axis and a connection part connecting the two electrodes, and that the two electrodes each have a shape in which a sum of the facing areas between the respective two electrodes and the strip electrode when the alignment direction coincides with the direction of the long axis is substantially equal to the area of one of the two electrodes.

With the above configuration, the facing area between the first and second electrodes can be made substantially constant when the power reception apparatus is turned by substantially 90 degrees to be placed on the power transmission apparatus, as in a case in which switching between the longitudinal placement and the lateral placement is performed.

In the wireless power transmission system according to the present invention, the strip electrode may have a rectangular shape having long sides and short sides, and the two electrodes may have a square shape with sides of a length equal to that of the short sides and may be aligned such that the opposing side of one of the two electrodes is parallel to the opposing side of the other of the two electrodes.

With the above configuration, the facing area between the first and second electrodes can be made substantially constant when the power reception apparatus is turned by substantially 90 degrees to be placed on the power transmission apparatus, as in the case in which switching between the longitudinal placement and the lateral placement is performed. For example, it is assumed that, when the power reception apparatus is placed on the power transmission apparatus, the entire face of one of the square electrodes opposes the rectangular electrode and the other of the square electrodes does not oppose the rectangular electrode. Turning the power reception apparatus by 90 degrees from this state results in a state in which one of the square electrodes opposes the rectangular electrode and the other thereof does not oppose the rectangular electrode.

In addition, if the power reception apparatus is subjected to a positional shift along the longitudinal direction of the rectangular electrode during the turn, part of one of the square electrodes does not oppose the rectangular electrode but part of the other of the square electrodes opposes the rectangular electrode. Accordingly, even if the power reception apparatus is turned by 90 degrees, the facing area between the first and second electrodes can be made substantially equal to the facing area therebetween before the turn.

In the wireless power transmission system according to the present invention, the strip electrode may have a rectangular shape having long sides and short sides, the two electrodes may include a rectangular electrode with sides of a length equal to the length of the short sides and a square electrode whose side is shorter than each side of the rectangular electrode, and the square electrode may be aligned with the rectangular electrode such that the opposing side of the square electrode is parallel to the opposing side of the rectangular electrode.

With the above configuration, the facing area between the first and second electrodes can be made substantially constant when the power reception apparatus is turned by substantially 90 degrees to be placed on the power transmission apparatus, as in the case in which switching between the longitudinal placement and the lateral placement is performed.

In the wireless power transmission system according to the present invention, the sides along the alignment direction of the rectangular electrode preferably have a length within a range from 1.1 to 1.25 times the length of each side of the square electrode.

With the above configuration, setting the sides of the rectangular electrode to a length within a range from 1.1 to 1.25 times the length of each side of the square electrode allows the facing area between the first and second electrodes to be substantially constant.

In the wireless power transmission system according to the present invention, the power transmission apparatus preferably includes a holding face on which the power reception apparatus is to be placed and a backrest face that supports the power reception apparatus placed on the holding face and that is perpendicular to the holding face. The first electrode preferably has a rectangular shape and is preferably provided along the backrest face such that a longitudinal direction of the first electrode is parallel to the holding face. The long side of the first electrode toward the holding face is preferably spaced from the holding face by a distance L. The power reception apparatus preferably has a rectangular support face that is supported by the backrest face when the power reception apparatus is placed on the holding face. When the power reception apparatus is placed on the power transmission apparatus such that a first side of the four sides of the support face is parallel to the holding face, the second electrode is preferably provided in parallel to the holding face such that the two electrodes are aligned in parallel to the first side of the support face and the respective sides of the two electrodes toward the holding face are preferably apart from the holding face by the distance L.

With the above configuration, when the power transmission is performed with the power reception apparatus being set against the power transmission apparatus, the facing area between the first and second electrodes can be made constant regardless of the placement state in which the power reception apparatus is placed such that the longitudinal direction of the support face is perpendicular to the holding face of the power transmission apparatus or the placement state in which the power reception apparatus is placed such that the longitudinal direction of the support face is parallel to the holding face of the power transmission apparatus. Accordingly, it is possible to improve the degree of freedom of the orientation of placement of the power reception apparatus on the power transmission apparatus without degrading the power transmission efficiency.

In the wireless power transmission system according to the present invention, when the power reception apparatus is placed on the power transmission apparatus such that the longitudinal direction of the support face is perpendicular to the holding face, the second electrode is preferably provided along the direction perpendicular to the holding face such that the two electrodes are aligned in the direction of the first side of the support face and one side toward the holding face of the electrode toward the holding face, among the two electrodes, is preferably apart from the holding face by a distance L.

With the above configuration, since the distance L between the square electrode of the second electrode toward the holding face and the holding face can be minimized, it is possible to reduce the power transmission apparatus and the power reception apparatus in size.

In the wireless power transmission system according to the present invention, the rectangular electrode of the two electrodes is preferably at the side of the holding face.

With the above configuration, the rectangular electrode can be at the holding face to make the facing area between the first and second electrodes substantially constant.

In the wireless power transmission system according to the present invention, the power transmission apparatus preferably includes a third electrode that is provided along the holding face. A voltage is applied between the third electrode and the first electrode by the voltage generating circuit. The power reception apparatus preferably includes fourth electrodes that are provided in at least two opposing side faces, among the four sides adjacent to the support face. The voltage step-down circuit is connected between the fourth electrodes and the second electrode. When the power reception apparatus is placed on the power transmission apparatus, the third electrode preferably directly conducts to the fourth electrodes. The third electrode is called the passive electrode at the power transmission apparatus side and the fourth electrode is called the passive electrode at the power reception apparatus side.

With the above configuration, the active electrode (the first electrode) of the power transmission apparatus is capacitively coupled to the active electrode (the second electrode) of the power reception apparatus and the passive electrode (the third electrode) of the power transmission apparatus directly conducts to the passive electrodes (the fourth electrodes) of the power reception apparatus for resistance coupling to transmit power from the power transmission apparatus to the power reception apparatus.

In the wireless power transmission system according to the present invention, the power transmission apparatus preferably includes a rectangular third electrode which is provided along the backrest face such that the longitudinal direction of the third electrode is parallel to the holding face and the long side of which toward the holding face is apart from the holding face by a distance D. A voltage is applied between the third electrode and the first electrode by the voltage generating circuit. The power reception apparatus preferably includes a rectangular fourth electrode which is provided along the support face such that the longitudinal direction of the fourth electrode is parallel to the holding face and the long side of which toward the holding face is apart from the holding face by the distance D (D<L). The voltage step-down circuit is connected between the fourth electrode and the second electrode. When the power reception apparatus is placed on the power transmission apparatus, the third electrode is preferably close to the fourth electrode.

With the above configuration, the active electrode (the first electrode) of the power transmission apparatus is capacitively coupled to the active electrode (the second electrode) of the power reception apparatus and the passive electrode (the third electrode) of the power transmission apparatus is close to the passive electrode (the fourth electrode) of the power reception apparatus for capacitive coupling to transmit power from the power transmission apparatus to the power reception apparatus.

In the wireless power transmission system according to the present invention, the power transmission apparatus may include a third electrode opposing the first electrode. A voltage is applied between the third electrode and the first electrode by the voltage generating circuit. The power reception apparatus may include a fourth electrode opposing the second electrode. The voltage step-down circuit is connected between the fourth electrode and the second electrode. When the power reception apparatus is placed on the power transmission apparatus, the third electrode may be capacitively coupled to the fourth electrode with the first electrode and the second electrode sandwiched therebetween.

With the above configuration, since the first electrode is capacitively coupled to the second electrode and the third electrode is capacitively coupled to the fourth electrode, it is not necessary to make the electrodes bare.

In the wireless power transmission system according to the present invention, the power transmission apparatus and the power reception apparatus preferably each include an engagement part. The engagement part of the power transmission apparatus engages with the engagement part of the power reception apparatus when the power reception apparatus is moved over an allowable range from the facing area between the first electrode and the second electrode in the certain state or the turned state.

With the above configuration, it is easy to detect the power reception apparatus that is mounted so that the facing area between the first electrode and the second electrode exceeds the allowable range with the engagement parts of the power transmission apparatus and the power reception apparatus. Accordingly, it is possible for a user to mount the power reception apparatus at an appropriate position on the power transmission apparatus, thus realizing the stable power transmission.

In the wireless power transmission system according to the present invention, the power transmission apparatus and the power reception apparatus may each include a plane. The plane of the power transmission apparatus is in contact with the plane of the power reception apparatus when the power reception apparatus is placed on the power transmission apparatus. The engagement part of one of the power transmission apparatus and the power reception apparatus may include two protrusion parts that protrude toward the other of the power transmission apparatus and the power reception apparatus and that are provided on the plane so as to be apart from each other by a first distance. The engagement part of the other of the power transmission apparatus and the power reception apparatus may include two recesses that are engaged with the two protrusion parts and that are provided on the plane so as to be apart from each other by a second distance shorter than the first distance.

With the above configuration, it is possible to mount the power reception apparatus on the power transmission apparatus with a certain distance allowance.

In the wireless power transmission system according to the present invention, the strip electrode may have a rectangular shape having short sides of a length X and long sides of a length Y. The two electrodes may have a square shape with sides of the length X and are aligned along a longitudinal direction of the strip electrode so as to be apart from each other by a distance (Y−X). The two protrusion parts and the two recesses may be provided along the longitudinal direction. A difference between the distance between the two protrusion parts and the distance between the two recesses may be equal to (2Y−X).

With the above configuration, the facing area between the first electrode and the second electrode is substantially constant even if the power reception apparatus is mounted with being shifted along the longitudinal direction, for example, in the certain state, thus realizing the stable power transmission. In addition, since one of the two protrusion parts runs on the part between the recesses if the allowable range is exceeded, it is possible for the user to detect that the allowable mounting range allowing the stable power transmission is exceeded.

In the wireless power transmission system according to the present invention, the strip electrode may have a rectangular shape having short sides of a length X and long sides of a length Y. The two electrodes may have a square shape with sides of the length X and are aligned along a direction orthogonal to a longitudinal direction of the strip electrode so as to be apart from each other by a distance (Y−X). The two protrusion parts may be provided along the direction orthogonal to the longitudinal direction. The two recesses may be provided along the orthogonal direction. A difference between the distance between the two protrusion parts and the distance between the two recesses may be equal to (Y−X).

With the above configuration, the facing area between the first electrode and the second electrode is substantially constant even if the power reception apparatus is mounted with being shifted along the direction orthogonal to the longitudinal direction, for example, in the turned state, thus realizing the stable power transmission. In addition, since one of the two protrusion parts runs on the part between the recesses if the allowable range is exceeded, it is possible for the user to detect that the allowable mounting range allowing the stable power transmission is exceeded.

In the wireless power transmission system according to the present invention, one of the third electrode and the fourth electrode is preferably provided in a plane part between the two protrusion parts. A protruded part sandwiched between the two recesses is preferably in contact with the plane part as a contact part and the other of the third electrode and the fourth electrode is preferably provided at the contact part.

With the above configuration, when one of the two protrusion parts runs on the part between the recesses, that is, when the power reception apparatus is mounted over the allowable range, the third electrode does not conduct to the fourth electrode. Accordingly, it is possible to stop the power transmission when the stable power transmission is not available.

In the wireless power transmission system according to the present invention, the length of the two side faces having the fourth electrodes of the power reception apparatus is preferably longer than that of the holding face.

When the length at the power reception apparatus side is longer than the holding face of the power transmission apparatus, the power reception apparatus can possibly falls from the holding face unless the power reception apparatus is mounted at an appropriate position. The provision of the engagement parts allows the detection of exceeding of the allowable range. Accordingly, it is possible to prevent the power reception apparatus from falling down from the holding face of the power transmission apparatus due to displacement of the center of gravity, thereby suppressing breakage or the like of the power reception apparatus.

According to the present invention, making the facing area between the opposing electrodes substantially constant regardless of the orientation of placement of the power reception apparatus on the power transmission apparatus allows the degree of freedom of the orientation of placement of the power reception apparatus on the power transmission apparatus to be improved without degrading the power transmission efficiency.

DETAILED DESCRIPTION OF THE PREFERRED EMBODIMENTS

Preferred embodiments of a wireless power transmission system according to the present invention will herein be described with reference to the attached drawings.

First Embodiment

A wireless power transmission system according to a first embodiment includes a power transmission apparatus and a power reception apparatus. The power reception apparatus is, for example, a portable electronic device provided with a secondary battery. The portable electronic device is, for example, a mobile phone, a personal digital assistant (PDA), a portable music player, a notebook personal computer (PC), or a digital camera. The power reception apparatus is placed on the power transmission apparatus. The power transmission apparatus serves as a battery charger for charging the secondary battery in the power reception apparatus.

Figure 1:
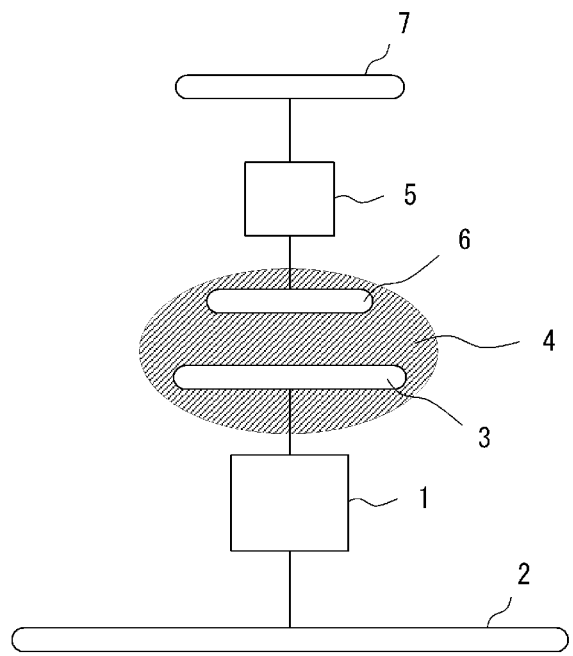
FIG. 1 shows the basic configuration of a power transmission system described in PTL 1.
Figure 2A:
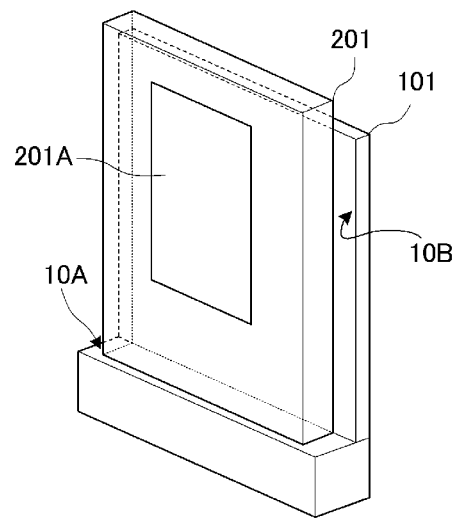
FIG. 2A is a perspective view of a power transmission apparatus and a power reception apparatus according to a first embodiment.
Figure 2B:
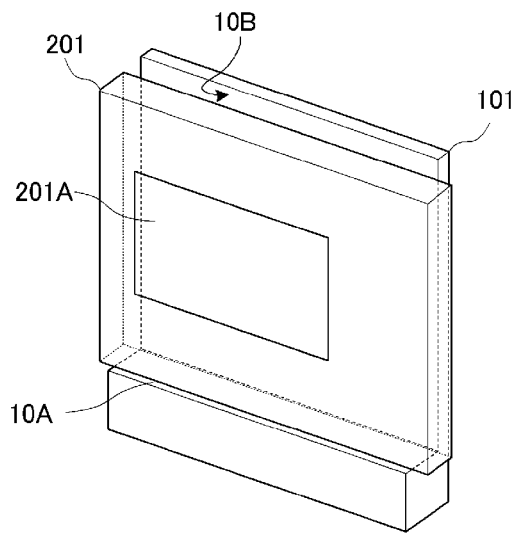
FIG. 2B is another perspective view of the power transmission apparatus and the power reception apparatus according to the first embodiment.

FIG. 2A and FIG. 2B are perspective views showing states in which the power reception apparatus is placed on the power transmission apparatus. A power transmission apparatus 101 has a holding face 10A substantially parallel to a mounting face and a backrest face 10B substantially perpendicular to the placing face 10A. A power reception apparatus 201 is placed on the holding face 10A. The backrest face 10B prevents the power reception apparatus 201 that is placed from leaning back or falling down.

The power reception apparatus 201 has a substantially rectangular parallelepiped casing, for example, having a liquid crystal screen 201A provided at its front side. The power reception apparatus 201 is placed on the holding face 10A such that its rear face (support face) is in contact with the backrest face 10B of the power transmission apparatus 101. FIG. 2A shows a state in which the power reception apparatus 201 is longitudinally placed on the power transmission apparatus 101 and FIG. 2B shows a state in which the power reception apparatus 201 is laterally placed on the power transmission apparatus 101.

The longitudinal placement means that the power reception apparatus 201 is placed on the power transmission apparatus 101 the bottom side down, and the lateral placement means that the power reception apparatus 201 is placed on the power transmission apparatus 101 a side face down. In the present embodiment, it is possible to charge the secondary battery in the power reception apparatus 201 regardless of the longitudinal placement or the lateral placement of the power reception apparatus 201 on the power transmission apparatus 101.

The power transmission apparatus 101 and the power reception apparatus 201 according to the present embodiment each include at least one passive electrode and at least one active electrode. When the power reception apparatus 201 is placed on the power transmission apparatus 101, the passive electrode of the power transmission apparatus 101 directly conducts to the passive electrode of the power reception apparatus 201 and the active electrode of the power transmission apparatus 101 opposes the active electrode of the power reception apparatus 201. Power is transmitted from the power transmission apparatus 101 to the power reception apparatus 201 via an electric field occurring between the opposing active electrodes to charge the secondary battery in the power reception apparatus 201.

Figure 3:
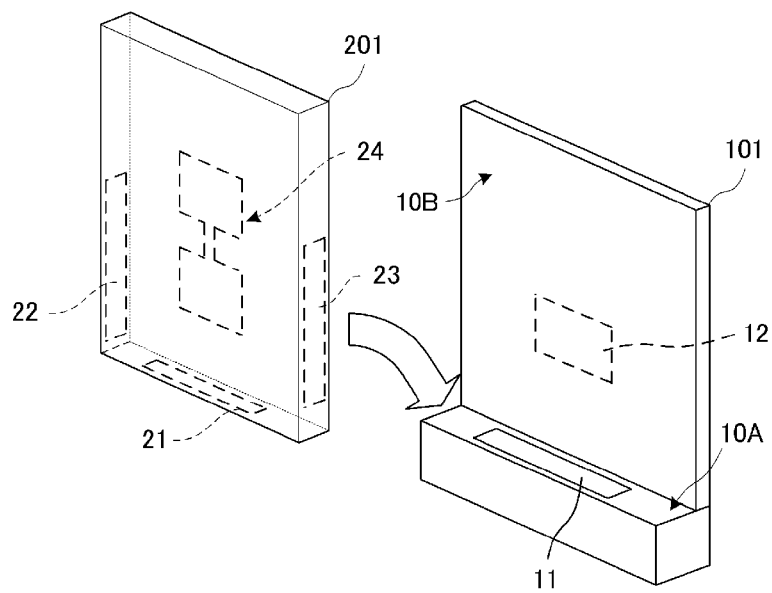
FIG. 3 is a diagram showing passive electrodes and active electrodes provided in the power transmission apparatus and the power reception apparatus.

FIG. 3 is a diagram showing passive electrodes and active electrodes provided in the power transmission apparatus 101 and the power reception apparatus 201. The liquid crystal screen 201A shown in FIG. 2A and FIG. 2B is omitted in FIG. 3.

A passive electrode 11 of the power transmission apparatus 101 has a rectangular shape and is provided along the holding face 10A such that the longitudinal direction of the passive electrode 11 coincides with the width direction of the power transmission apparatus 101. The passive electrode 11 is partially or entirely bare so that the passive electrode 11 directly conducts to a passive electrode 21 (or 22 or 23) of the power reception apparatus 201 described below when the power reception apparatus 201 is placed on the power transmission apparatus 101.

An active electrode 12 of the power transmission apparatus 101 has a rectangular shape and is provided along the backrest face 10B. The active electrode 12 opposes an active electrode 24 of the power reception apparatus 201 described below via a gap when the power reception apparatus 201 is placed on the power transmission apparatus 101.

The power reception apparatus 201 has the three rectangular passive electrodes 21, 22, and 23. The passive electrode 21 is provided along the bottom face of the power reception apparatus 201 and the passive electrodes 22 and 23 are provided along side faces of the power reception apparatus 201. The passive electrodes 21, 22, and 23 are partially or entirely bare so that the passive electrodes 21, 22, and 23 directly conduct to the passive electrode 11 of the power transmission apparatus 101 when the power reception apparatus 201 is placed on the power transmission apparatus 101.

For example, when the power reception apparatus 201 is longitudinally placed on the power transmission apparatus 101, the passive electrode 21 provided along the bottom face directly conducts to the passive electrode 11. When the power reception apparatus 201 is laterally placed on the power transmission apparatus 101, the passive electrode 22 (or 23) provided along a side face directly conducts to the passive electrode 11.

The active electrode 24 of the power reception apparatus 201 is provided along the rear face thereof. Part of the active electrode 24 opposes the active electrode 12 when the power reception apparatus 201 is longitudinally or laterally placed on the power transmission apparatus 101. The active electrode 24 has a shape in which the facing area to the active electrode 12 when the power reception apparatus 201 is longitudinally placed on the power transmission apparatus 101 is substantially equal to the facing area to the active electrode 12 when the power reception apparatus 201 is laterally placed on the power transmission apparatus 101. The shape, etc. of the active electrode 24 will be described below.

The sizes of the passive electrode 11 and the passive electrodes 21, 22, and 23 and the positions where the passive electrode 11 and the passive electrodes 21, 22, and 23 are mounted are determined so that the active electrode 12 opposes the active electrode 24 when the power reception apparatus 201 is longitudinally or laterally placed on the power transmission apparatus 101 and may be appropriately varied.

Figure 4A:
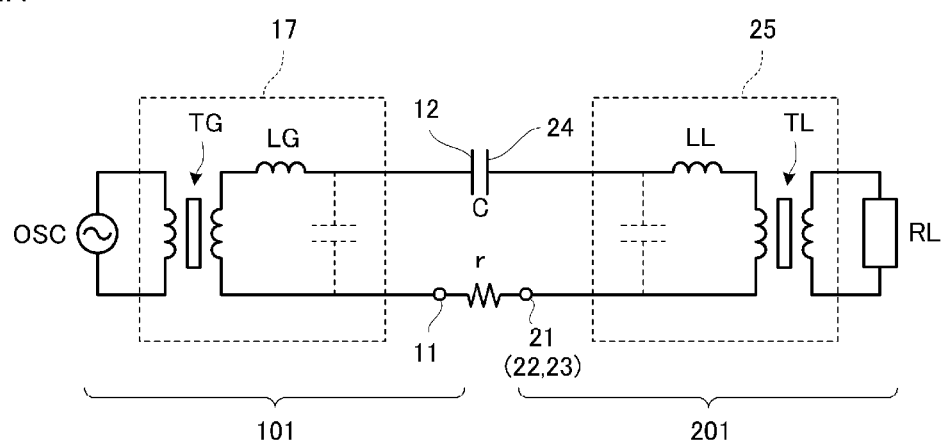
FIG. 4A is an equivalent circuit diagram of a wireless power transmission system when the power reception apparatus is placed on the power transmission apparatus and the passive electrodes are resistance-coupled to each other.

FIG. 4A is an equivalent circuit diagram of the wireless power transmission system when the power reception apparatus 201 is placed on the power transmission apparatus 101. A voltage step-up circuit 17 including a step-up transformer TG and an inductor LG is connected to the passive electrode 11 and the active electrode 12 of the power transmission apparatus 101. The voltage step-up circuit 17 increases a voltage generated by a high-frequency voltage generating circuit OSC that generates a high-frequency voltage of a frequency, for example, from 100 kHz to several tens MHz to apply the voltage between the passive electrode 11 and the active electrode 12.

A voltage step-down circuit 25 including a step down transformer TL and an inductor LL is connected between the passive electrodes 21, 22, and 23 and the active electrode 24 of the power reception apparatus 201. A load circuit RL is connected at a secondary side of the step down transformer TL. The load circuit RL includes a rectifier-smoothing circuit and the secondary battery (not shown).

Figure 5:
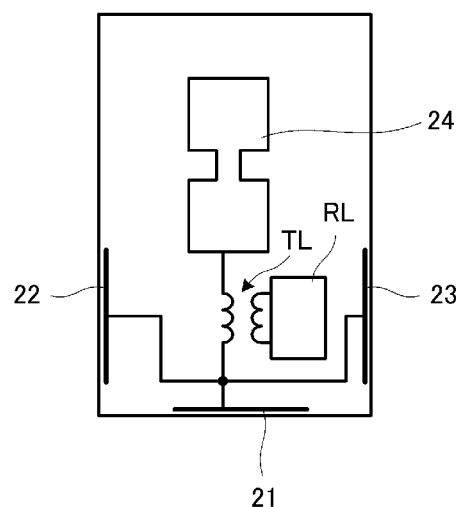
FIG. 5 is a schematic circuit diagram of the power reception apparatus.

FIG. 5 is a schematic circuit diagram of the power reception apparatus 201. A primary side of the step down transformer TL is connected between the three passive electrodes 21, 22, and 23 and the active electrode 24. The load circuit RL is connected to the secondary side of the step down transformer TL. Since the three passive electrodes 21, 22, and 23 are commonly connected, they have the same potential.

When the power reception apparatus 201 is longitudinally or laterally placed on the power transmission apparatus 101, the active electrode 12 is close to the active electrode 24 via the gap to compose a capacitor C. The passive electrode 11 is in contact with the passive electrode 21 (or 22 or 23) to directly conduct to the passive electrode 21 (or 22 or 23). A resistor r between the passive electrode 11 and the passive electrode 21 (or 22 or 23) shown in FIG. 4A is a contact resistor that is formed at a portion where the passive electrode 11 is in contact with the passive electrode 21 (or 22 or 23).

The placement of the power reception apparatus 201 on the power transmission apparatus 101 composes a closed circuit, as shown in FIG. 4A, in which the active electrode 12 is electrically coupled to the active electrode 24. The power is transmitted from the power transmission apparatus 101 to the power reception apparatus 201 owing to the electric field coupling. As a result, the secondary battery in the power reception apparatus 201 is charged.

Figure 4B:
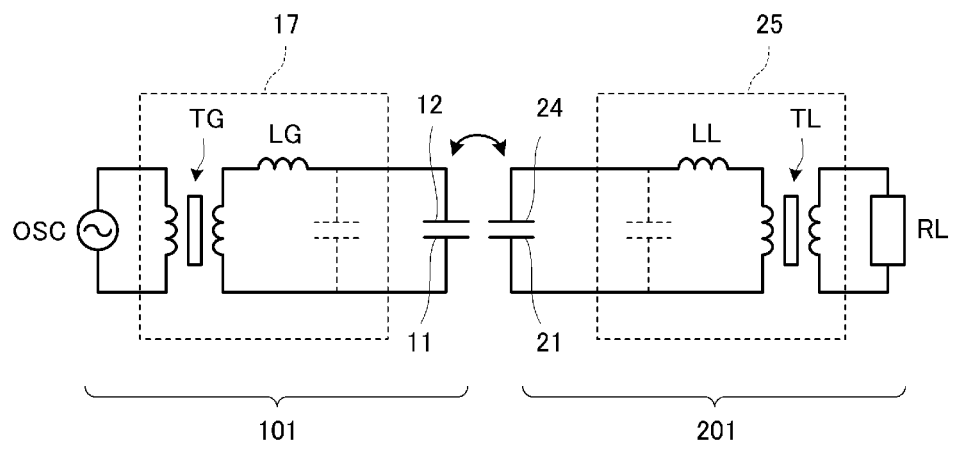
FIG. 4B is an equivalent circuit diagram of the wireless power transmission system when the power reception apparatus is placed on the power transmission apparatus and the passive electrodes are capacitively coupled to each other.

In the equivalent circuit diagram in FIG. 4A, the active electrode 12 is close to the active electrode 24 via the gap to be capacitively coupled to the active electrode 24. The passive electrode 11 is in contact with the passive electrode 21 (or 22 or 23) to directly conduct to the passive electrode 21 (or 22 or 23) for resistance coupling. Alternatively, in addition to the active electrode 12 that is close to the active electrode 24 via the gap to be capacitively coupled to the active electrode 24, the passive electrode 11 may be close to the passive electrode 21 (or 22 or 23) via a gap to be capacitively coupled to the passive electrode 21 (or 22 or 23). FIG. 4B shows an equivalent circuit diagram in this case.

In the equivalent circuit of the wireless power transmission system shown in FIG. 4A, the entire system may be considered as a series resonance circuit including an inductor L resulting from addition of the inductance of the inductor in the voltage step-up circuit 17 to the inductance of the inductor in the voltage step-down circuit 25, the capacitor C, and the contact resistor r. In the case of the series resonance circuit using the inductor and the capacitor, a Q value (Quality Factor) representing the sharpness of the peak in the resonance is represented as follows:

$$Q = \frac{1}{R}\sqrt{\frac{L}{C}} \qquad \text{[Formula 1]}$$

The quality of the resonant circuit is increased and the power transmission efficiency is improved with the increasing Q value. Accordingly, the Q value is increased with the decreasing capacitance of the capacitor C according to the above equation. Consequently, the Q value is decreased and the power transmission efficiency is also reduced as the capacitor C composed of the active electrode 12 and the active electrode 24 is increased, that is, as the facing area between the active electrode 12 and the active electrode 24 is increased. In contrast, the electric field coupling is reduced with the decreasing facing area between the active electrode 12 and the active electrode 24 and it is not possible to produce transmission power sufficient for charging the secondary battery in the power reception apparatus 201 in this case.

Accordingly, the facing area between the active electrode 24 of the power reception apparatus 201 and the active electrode 12 of the power transmission apparatus 101 in the longitudinal placement can be made constantly substantially equal to the facing area between the active electrode 24 of the power reception apparatus 201 and the active electrode 12 of the power transmission apparatus 101 in the lateral placement to efficiently charge the secondary battery in the power reception apparatus 201.

Figure 6:
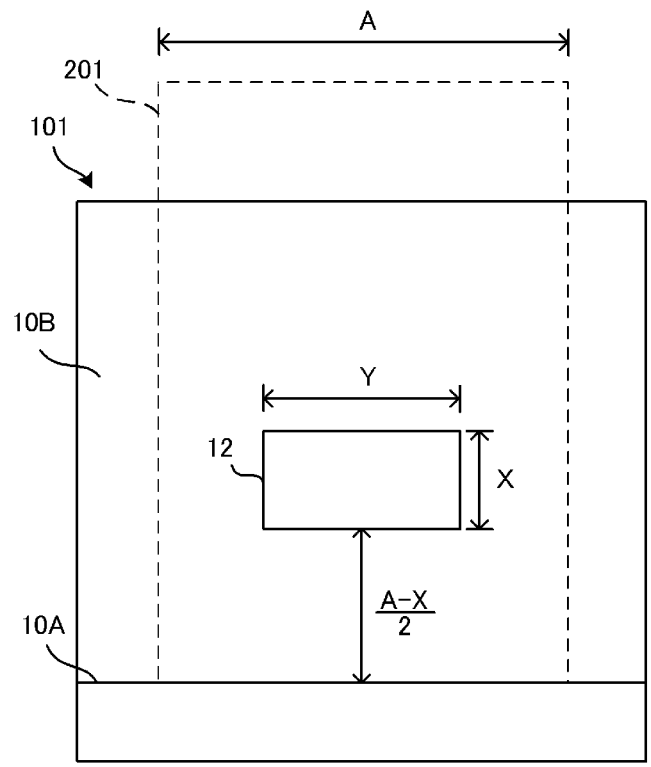
FIG. 6 is a schematic diagram for describing the active electrode of the power transmission apparatus.

FIG. 6 is a schematic diagram for describing the active electrode 12 of the power transmission apparatus 101. FIG. 6 is a front view of the power transmission apparatus 101, in which the backrest face 10B side is supposed to be the front face. The passive electrode 11 is omitted in FIG. 6. It is assumed in the present embodiment that the width of the casing of the power reception apparatus 201 is equal to a length A.

The active electrode 12 of the power transmission apparatus 101 has a rectangular shape having short sides of a length X and long sides of a length Y. The active electrode 12 is provided such that the long sides extend in the width direction of the power transmission apparatus 101, the short sides extend in the height direction of the power transmission apparatus 101, and the active electrode 12 is positioned in the center in the width direction. In addition, the long side toward the holding face 10A of the active electrode 12 is spaced from the holding face 10A by a distance (A−X)/2. The distance (A−X)/2 corresponds to a distance L according to the present invention.

Figure 7:
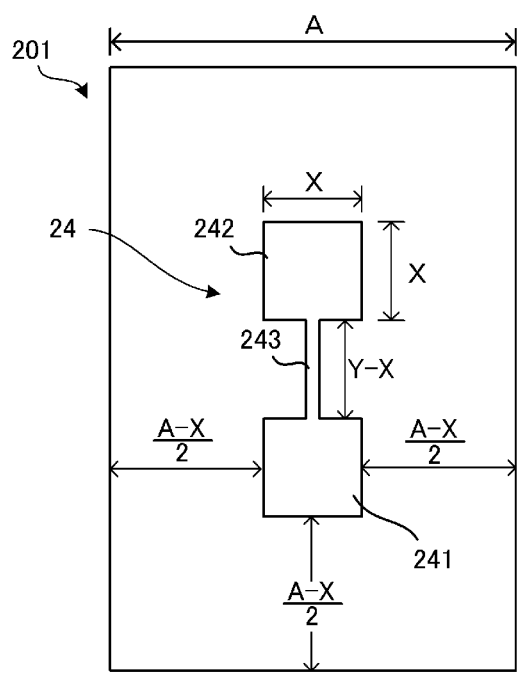
FIG. 7 is a schematic diagram for describing the active electrode of the power reception apparatus.

FIG. 7 is a schematic diagram for describing the active electrode of the power reception apparatus 201. FIG. 7 is seen from the rear face side and the vertical direction on the sheet corresponds to the height direction of the power reception apparatus 201. The passive electrodes 21, 22, and 23 are omitted in FIG. 7.

The active electrode 24 of the power reception apparatus 201 includes two electrodes 241 and 242 each having a square shape with sides of the length X. The two square electrodes 241 and 242 are configured so as to be arranged in parallel to each other and so as to be connected to each other via a linear electrode (connection part) 243 of a length (Y−X). Although the width of the line electrode 243 is not specifically limited, it is preferred that the electric field coupling occurring with the opposing active electrode 12 be within a range that does not have an unignorable effect on the transmission power.

The active electrode 24 is provided such that the square electrodes 241 and 242 are arranged in the height direction of the power reception apparatus 201. In addition, the active electrode 24 is provided such that the sides of the square electrodes 241 and 242 toward the side faces of the casing are spaced from the corresponding side faces of the casing by a distance (A−X)/2 in order to be positioned in the center in the width direction of the casing. Furthermore, one of the square electrodes 241 and 242 (the square electrode 241 in FIG. 7), which is positioned at the bottom face side, is spaced from the bottom face of the casing of the power reception apparatus 201 by the distance (A−X)/2. In other words, the square electrode 241 is provided at a position that is equally spaced from the bottom face of the casing of the power reception apparatus 201 and each side face thereof.

Figure 8A:
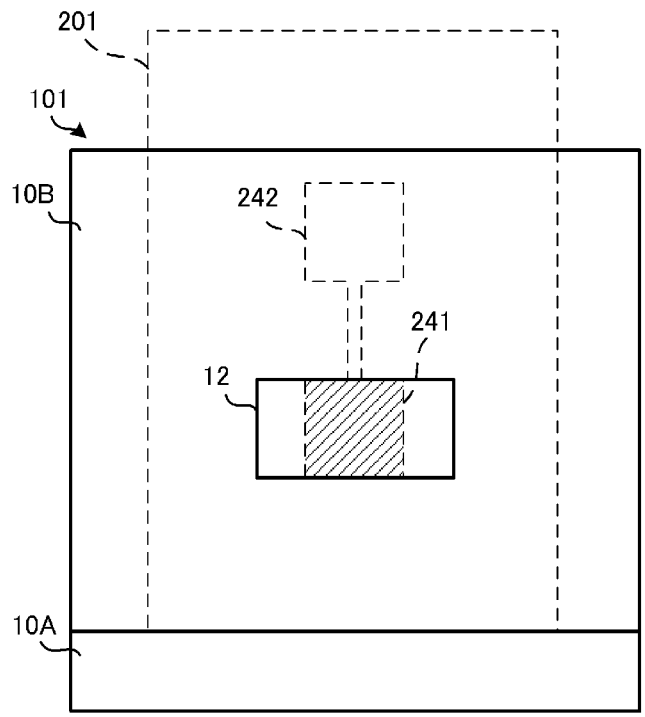
FIG. 8A is a diagram for describing the active electrodes and a facing area between the active electrodes when the power reception apparatus is longitudinally placed on the power transmission apparatus.
Figure 8B:
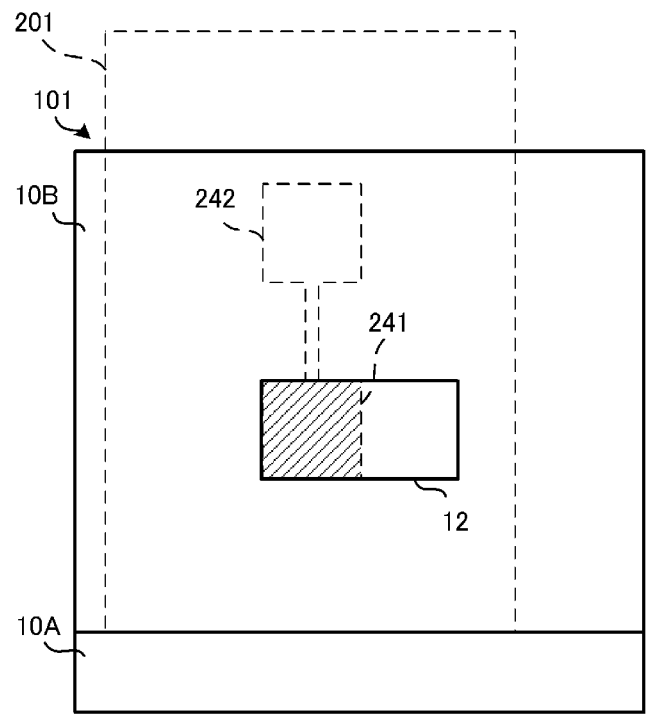
FIG. 8B is another diagram for describing the active electrodes and the facing area between the active electrodes when the power reception apparatus is longitudinally placed on the power transmission apparatus.

FIG. 8A and FIG. 8B are diagrams for describing the facing area between the active electrode 12 and the active electrode 24 when the power reception apparatus 201 is longitudinally placed on the power transmission apparatus 101. FIG. 8A shows a case in which the power reception apparatus 201 is placed in the center in the width direction of the power transmission apparatus 101. FIG. 8B shows a case in which the power reception apparatus 201 is placed with being shifted from the center in the width direction of the power transmission apparatus 101. Hatched portions show the faces where the active electrode 12 opposes the active electrode 24 in FIG. 8A and FIG. 8B.

The active electrode 12 is provided at a position vertically apart from the holding face 10A by the height (A−X)/2 and the short sides along the height direction each have the length X. The active electrode 24 is provided at a position apart from the bottom face of the casing of the power reception apparatus 201 by the height (A−X)/2 and each side along the height direction has the length X.

Accordingly, when the power reception apparatus 201 is longitudinally placed in the center of the power transmission apparatus 101, as shown in FIG. 8A, the entire face of the square electrode 241 of the active electrode 24 opposes the active electrode 12.

Even when the power reception apparatus 201 is shifted in the width direction, as shown in FIG. 8B, the entire face of the square electrode 241 opposes the active electrode 12 as long as the shift distance is within the length Y of the long side of the active electrode 12. Accordingly, the facing area is equal to that in FIG. 8A.

Figure 9A:
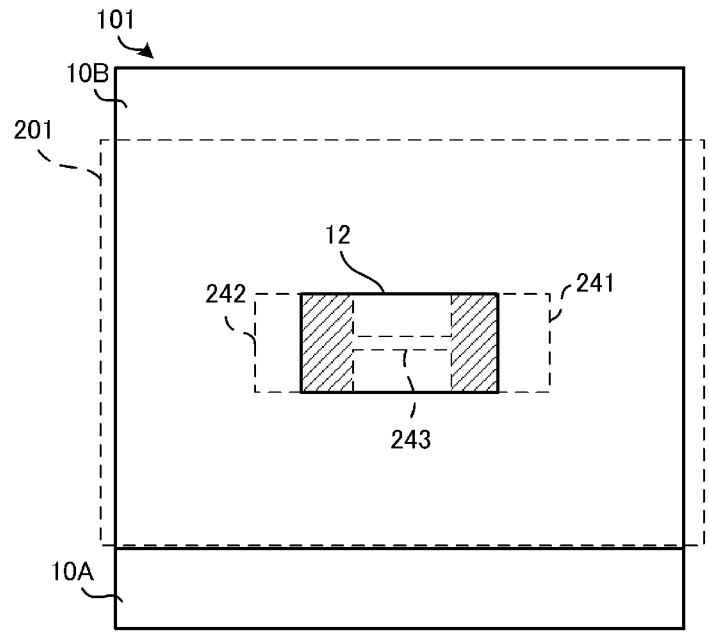
FIG. 9A is a diagram for describing the active electrodes and the facing area between the active electrodes when the power reception apparatus is laterally placed on the power transmission apparatus.
Figure 9B:
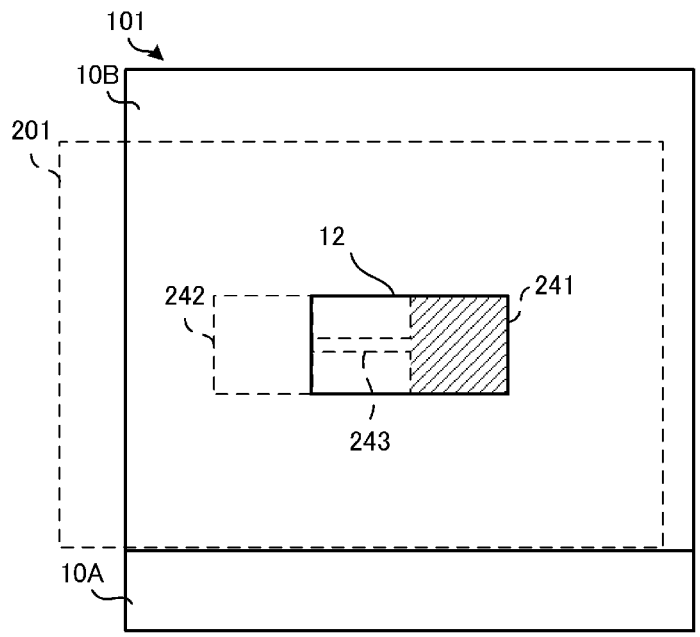
FIG. 9B is another diagram for describing the active electrodes and the facing area between the active electrodes when the power reception apparatus is laterally placed on the power transmission apparatus.

FIG. 9A and FIG. 9B are diagrams for describing the facing area between the active electrode 12 and the active electrode 24 when the power reception apparatus 201 is laterally placed on the power transmission apparatus 101. FIG. 9A shows a case in which the power reception apparatus 201 is placed in the center in the width direction of the power transmission apparatus 101. FIG. 9B shows a case in which the power reception apparatus 201 is placed with being shifted from the center in the width direction of the power transmission apparatus 101. Hatched portions show the faces where the active electrode 12 opposes the active electrode 24 in FIG. 9.

The active electrode 12 is provided at a position vertically apart from the holding face 10A by the height (A−X)/2 and the short sides along the height direction each have the length X. The active electrode 24 is provided at a position apart from each side face of the casing of the power reception apparatus 201 by the height (A−X)/2 and each side in the width direction of the power reception apparatus 201, that is, in the height direction of the power transmission apparatus 101 in the lateral placement has the length X. The square electrode 241 is apart from the square electrode 242 by the length (Y−X).

When the power reception apparatus 201 is laterally placed in the center of the power transmission apparatus 101, as shown in FIG. 9A, the facing area between the square electrode 241 of the active electrode 24 and the active electrode 12 is equal to X(X/2). The facing area between the square electrode 242 of the active electrode 24 and the active electrode 12 is equal to X(X/2). Accordingly, the facing area between the active electrode 12 and the active electrode 24 is equal to $X^2$, which is equal to the area when the entire face of the square electrode 241 (or 242) opposes the active electrode 12.

Even when the power reception apparatus 201 is shifted in the width direction of the power transmission apparatus 101, as shown in FIG. 9B, the facing area between the active electrode 24 and the active electrode 12 is equal to the one in FIG. 9A as long as the shift distance is within the length Y of the long side of the active electrode 12.

As described above, in the power transmission with the power reception apparatus 201 placed on the power transmission apparatus 101, the facing area between the active electrode 12 and the active electrode 24 is equal to $X^2$ regardless of the longitudinal placement or the lateral placement of the power reception apparatus 201 on the power transmission apparatus 101. In addition, even if the power reception apparatus 201 is placed on the power transmission apparatus 101 at a position slightly shifted in the width direction from the center of the power transmission apparatus 101 in the width direction during the charge, the facing area between the active electrode 12 and the active electrode 24 is equal to $X^2$.

Accordingly, since the facing area between the active electrode 12 and the active electrode 24 is not largely varied between the longitudinal placement of the power reception apparatus 201 on the power transmission apparatus 101 and the lateral placement of the power reception apparatus 201 on the power transmission apparatus 101, the power transmission efficiency is not reduced and, thus, the power that is transmitted is not reduced. Consequently, it is possible to reduce the complication of the accurate placement of the power reception apparatus 201 at a certain position on the power transmission apparatus 101 during the charge.

Figure 10A:
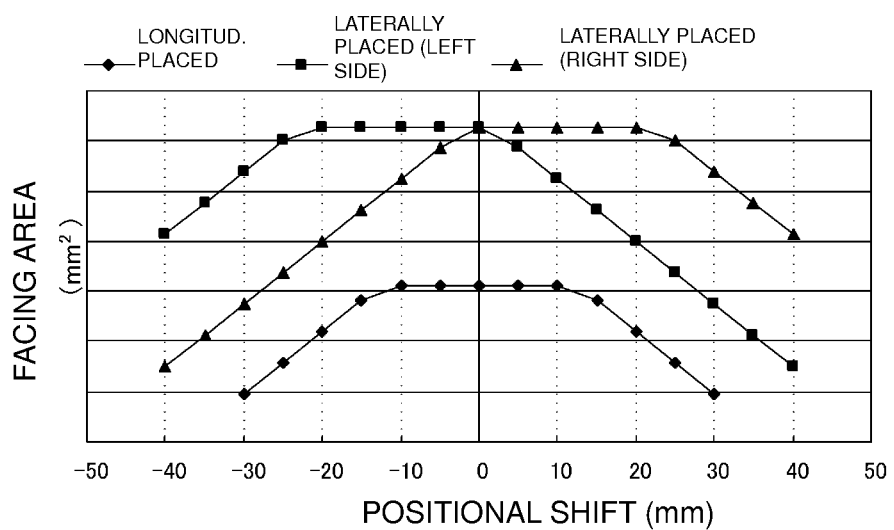
FIG. 10A is a graph showing the facing area between the active electrodes, which is varied with the placement state of the power reception apparatus.
Figure 10B:
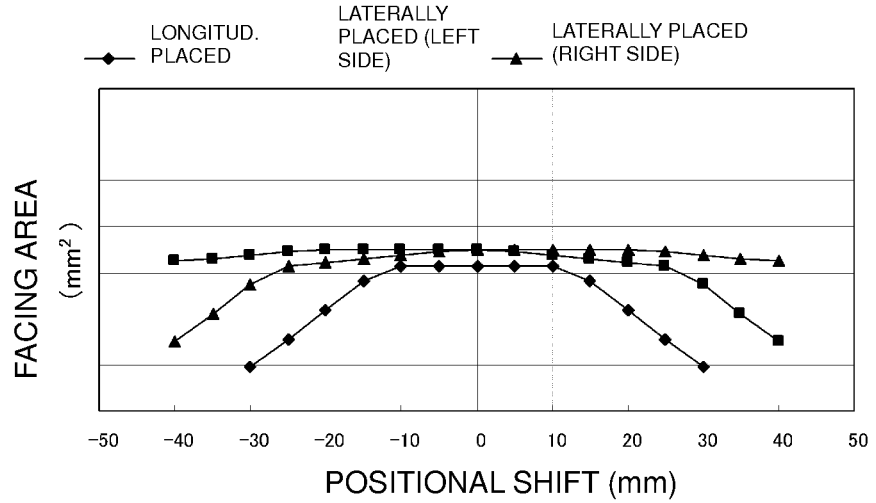
FIG. 10B is a graph showing the facing area between the active electrodes, which is varied with the placement state of the power reception apparatus.

FIG. 10A and FIG. 10B are graphs indicating the facing areas between the active electrodes, which are varied with the placement state of the power reception apparatus 201. FIG. 10A is a graph when all the active electrodes at the power transmission apparatus side and the power reception apparatus side have rectangular shapes. FIG. 10B is a graph in the case of the active electrode 12 and the active electrode 24 in the present embodiment. In the graphs in FIG. 10A and FIG. 10B, the positional shift when the power reception apparatus 201 is placed in the center of the power transmission apparatus 101 in the width direction (refer to FIG. 8A) is set to zero, the horizontal axis represents the positional shift from the center position, and the vertical axis represents the facing area between the active electrodes.

FIG. 10A shows that the facing area in the longitudinal placement of the power reception apparatus largely differs from the facing areas in the lateral placement of the power reception apparatus when the active electrodes at the power transmission apparatus side and the power reception apparatus side have rectangular shapes. In contrast, in the case of the active electrode 12 and the active electrode 24 in the present embodiment, the facing area in the longitudinal placement is substantially equal to the facing areas in the lateral placement.

As described above, the facing area between the active electrode 12 and the active electrode 24 in the longitudinal placement of the power reception apparatus 201 on the power transmission apparatus 101 can be made substantially equal to the facing area between the active electrode 12 and the active electrode 24 in the lateral placement of the power reception apparatus 201 on the power transmission apparatus 101 in the present embodiment. Accordingly, it is possible to improve the degree of freedom of the orientation of placement of the power reception apparatus 201 on the power transmission apparatus 101 without degrading the power transmission efficiency and the amount of transmitted power.

The specific configuration, etc. of the wireless power transmission system may be appropriately varied. The functions and the advantageous effects described in the above embodiment are only preferred examples of the present invention, and the functions and the advantageous effects of the present invention are not limited to the ones described in the above embodiment.

Although the facing area between the active electrode 12 of the power transmission apparatus 101 and the active electrode 24 of the power reception apparatus 201 during the charge is made constant in the present embodiment, it is possible to stably supply the power from the power transmission apparatus 101 to the power reception apparatus 201 even if the facing area is varied within a range of about 69%. Modifications of the shape of the active electrode 24 of the power reception apparatus 201 when the facing area is varied will now be described.

Figure 11A:
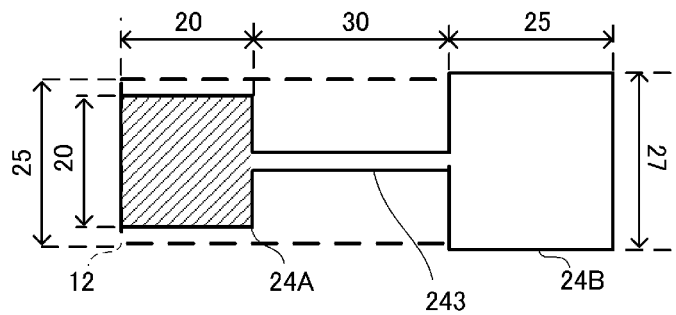
FIG. 11A includes schematic diagrams for describing variation in the facing area in the lateral placement of the power reception apparatus.
Figure 11A:
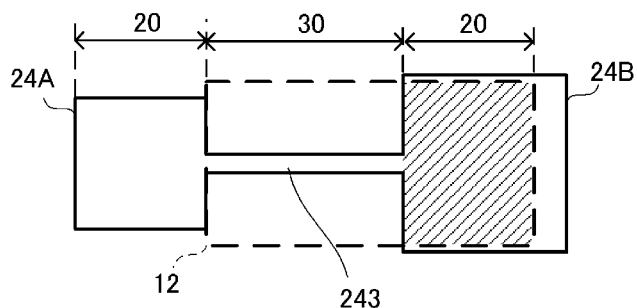
Figure 11A:
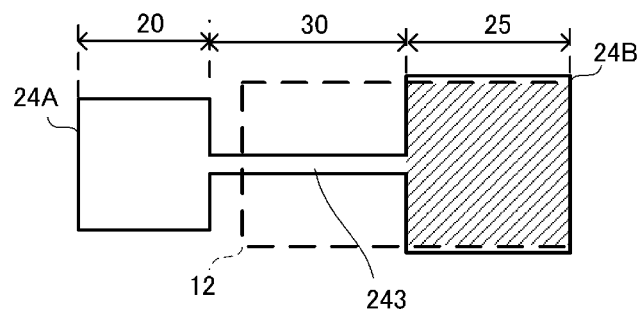
Figure 11B:
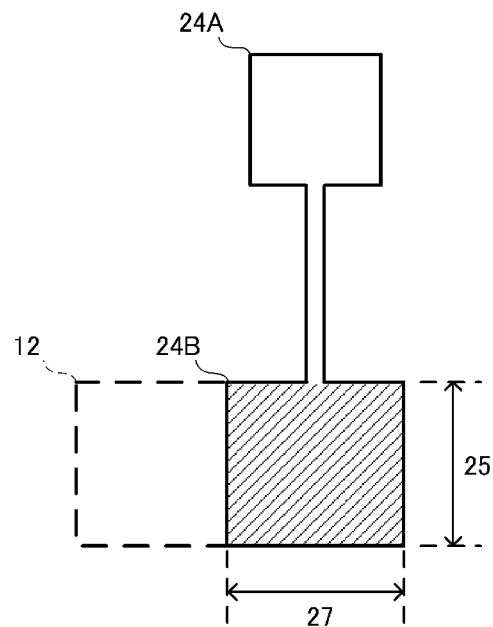
FIG. 11B includes schematic diagrams for describing variation in the facing area in the longitudinal placement of the power reception apparatus.
Figure 11B:
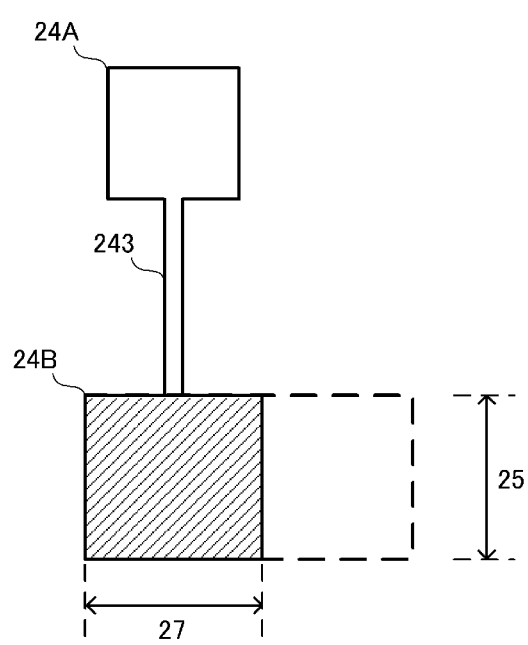

FIG. 11A includes schematic diagrams for describing variation in the facing area in the lateral placement of the power reception apparatus 201. FIG. 11B includes schematic diagrams for describing variation in the facing area in the longitudinal placement of the power reception apparatus 201. In FIG. 11A and FIG. 11B, the active electrode 12 at the power transmission apparatus 101 side has a rectangular shape having short sides of 25 mm and long sides of 50 mm. The active electrode 24 at the power reception apparatus 201 side has a shape in which a square electrode 24A with sides of 20 mm is connected to a rectangular electrode 24B having short sides of 25 mm and long sides of 27 mm via a linear electrode having a length of 30 mm.

FIG. 11A shows a reference position where the entire square electrode 24A of the power reception apparatus 201 that is laterally placed opposes the active electrode 12 of the power transmission apparatus 101, a case in which a movable range of the power reception apparatus 201 in the width direction of the power transmission apparatus 101 is set to 20 mm, and a case in which the movable range of the power reception apparatus 201 in the width direction of the power transmission apparatus 101 is set to 25 mm.

When the active electrode 24 of the power reception apparatus 201 is at the reference position (the upper diagram in FIG. 11A), the facing area is equal to 400 mm2. The facing area between the linear electrode 243 and the active electrode 12 is ignored. When the power reception apparatus 201 is moved by 20 mm (the middle diagram in FIG. 11A), the facing area is equal to 500 mm2, which is larger than that at the reference position by about 25%. When the power reception apparatus 201 is moved by 25 mm (the lower diagram in FIG. 11A), the facing area is equal to 625 mm2, which is larger than that at the reference position by about 56%.

FIG. 11B shows a reference position where the entire square electrode 24B of the power reception apparatus 201 that is longitudinally placed opposes the active electrode 12 of the power transmission apparatus 101, and a case in which the movable range of the power reception apparatus 201 in the width direction of the power transmission apparatus 101 is set to 30 mm. At the reference position (the upper diagram in FIG. 11B), the facing area is equal to 675 mm2. Also when the power reception apparatus 201 is moved by 30 mm (the lower diagram in FIG. 11B), the facing area is equal to 675 mm2. However, this value is higher than that at the reference position in the lateral placement (the upper diagram in FIG. 11A) by about 69%.

In the above configurations, the facing area between the active electrode 12 of the power transmission apparatus 101 and the active electrode 24 of the power reception apparatus 201 is varied by about 69%. Even in this case, it is possible to stably supply the power from the power transmission apparatus 101 to the power reception apparatus 201. The facing area between the active electrode 12 and the active electrode 24 is substantially equal to each other in each case, and the value of 69% is within an allowable range of "substantially equal or constant." In addition, since the area of the rectangular electrode 24B of the active electrode 24 is large, the electric field coupling with the active electrode 12 can be made large. Furthermore, since the square electrode 24A arranged at an upper position of the rectangular electrode 24B in the longitudinal placement is smaller than the rectangular electrode 24B, it is possible to decrease the stray capacitance between the active electrode and the passive electrode, which can cause a reduction in the transmission efficiency, thus realizing the efficient power transmission.

The sides of the rectangular electrode 24B shown in FIG. 11A and FIG. 11B in the direction in which the rectangular electrode 24B is aligned with the square electrode 24A each have a length of 25 mm, which is 1.25 times longer than the 20 mm-long side of the square electrode 24A. Accordingly, it is desirable that the sides of the rectangular electrode 24B along the alignment direction have a length within a range from 1.1 to 1.25 times the length of each side of the square electrode 24A.

Figure 12A:
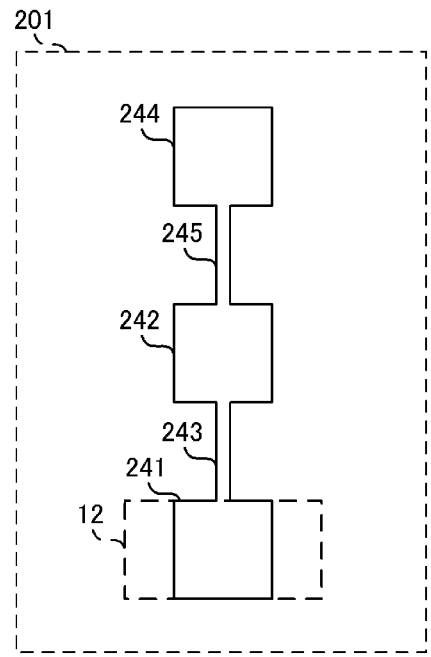
FIG. 12A is a schematic diagram showing another configuration of the active electrode provided in the power reception apparatus.
Figure 12B:
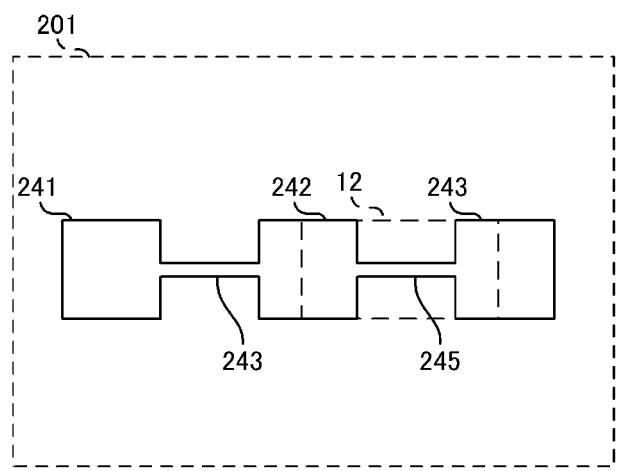
FIG. 12B is a schematic diagram showing another configuration of the active electrode provided in the power reception apparatus.
Figure 13A:
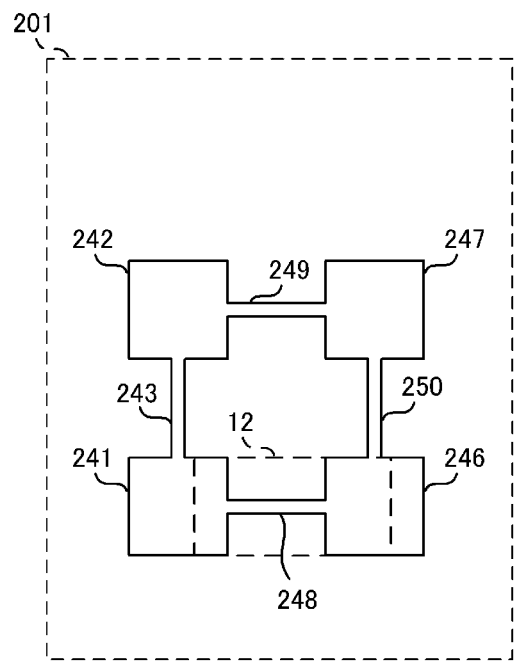
FIG. 13A is a schematic diagram showing another configuration of the active electrode provided in the power reception apparatus.
Figure 13B:
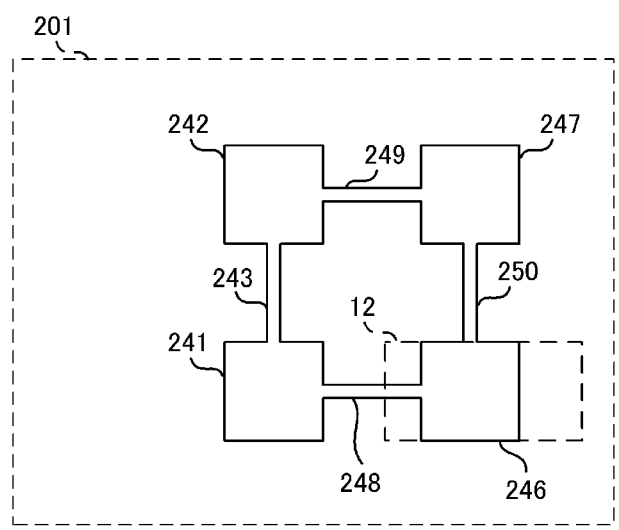
FIG. 13B is a schematic diagram showing another configuration of the active electrode provided in the power reception apparatus.

FIG. 12A, FIG. 12B, FIG. 13A, and FIG. 13B are schematic diagrams showing other configurations of the active electrode provided in the power reception apparatus 201. FIG. 12A and FIG. 13A show a state in which the power reception apparatus 201 is longitudinally placed and FIG. 12B and FIG. 13B show a state in which the power reception apparatus 201 is laterally placed.

As shown in FIG. 12A, the power reception apparatus 201 may have a configuration in which a square electrode 244 is arranged in parallel to the square electrode 242 of the active electrode 24 described above with reference to FIG. 7 and the square electrode 242 is connected to the square electrode 244 via a linear electrode 245 similar to the linear electrode 243. When the power reception apparatus 201 is laterally placed as shown in FIG. 12B in the above configuration, it is possible to make the facing area constant even if the positional shift in the width direction of the power transmission apparatus 101 (the longitudinal direction of the rectangular active electrode 12) is large.

Alternatively, as shown in FIG. 13A and FIG. 13B, the power reception apparatus 201 may have a configuration in which square electrodes 246 and 247 are arranged in parallel to the square electrodes 241 and 242 of the active electrode 24 described above with reference to FIG. 7 in the same direction with respect to the square electrodes 241 and 242. In this configuration, the square electrode 241 may be connected to the square electrode 246 via a linear electrode 248 similar to the linear electrode 243, the square electrode 242 may be connected to the square electrode 247 via a linear electrode 249 similar to the linear electrode 243, and the square electrode 246 may be connected to the square electrode 247 via a linear electrode 250 similar to the linear electrode 243. When the power reception apparatus 201 is longitudinally placed as shown in FIG. 13A in the above configuration, it is possible to make the facing area constant even if the positional shift in the width direction of the power transmission apparatus 101 (the longitudinal direction of the rectangular active electrode 12) is large.

Although the passive electrode 11 of the power transmission apparatus 101 is provided on the holding face 10A, the passive electrode 21 of the power reception apparatus 201 is provided along the bottom face of the casing of the power reception apparatus 201, and the passive electrodes 22 and 23 of the power reception apparatus 201 are provided along the side faces of the casing of the power reception apparatus 201 in the above embodiment, the power transmission apparatus 101 and the power reception apparatus 201 are not limited to this configuration.

Figure 14:
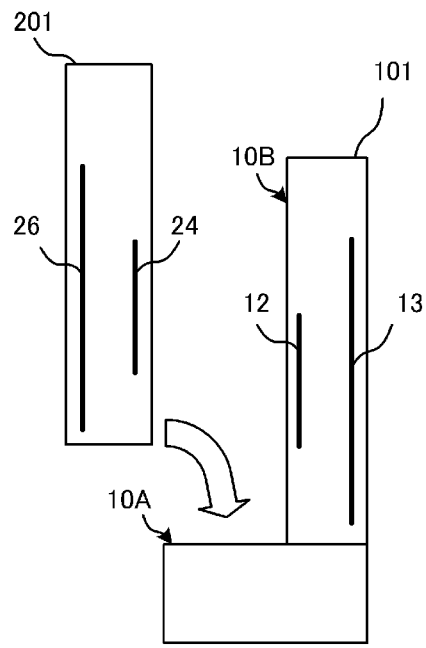
FIG. 14 is a diagram showing another example of how to mount the passive electrodes at the power transmission apparatus side and the power reception apparatus side.
Figure 15A:
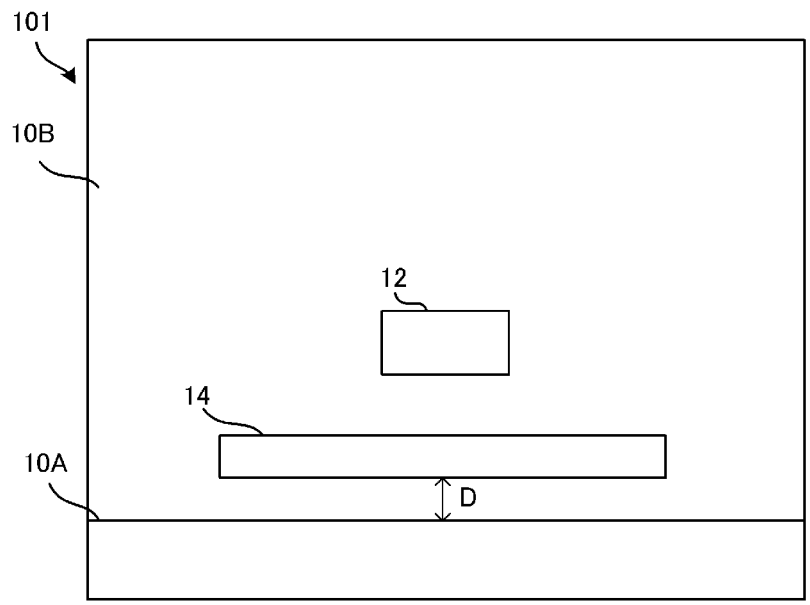
FIG. 15A is a diagram showing another example of how to mount the passive electrodes at the power transmission apparatus side and the power reception apparatus side.
Figure 15B:
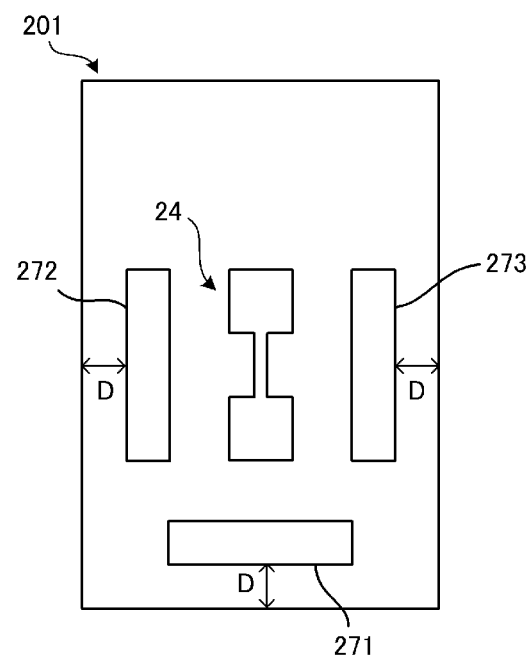
FIG. 15B is a diagram showing another example of how to mount the passive electrodes at the power transmission apparatus side and the power reception apparatus side.

FIG. 14, FIG. 15A, and FIG. 15B show other examples of how to mount passive electrodes at the power transmission apparatus side and the power reception apparatus side.

FIG. 14 is a side view of the power transmission apparatus 101 and the power reception apparatus 201. When the power reception apparatus 201 is placed on the power transmission apparatus 101, the active electrode 12 of the power transmission apparatus is close to the active electrode 24 of the power reception apparatus via the gap to cause the two electrodes to be electrically coupled to each other. A passive electrode 13 of the power transmission apparatus, the active electrode 12 of the power transmission apparatus, the active electrode 24 of the power reception apparatus, and a passive electrode 26 of the power reception apparatus are arranged in parallel to each other. In the example in FIG. 14, the passive electrode 13 of the power transmission apparatus is capacitively coupled to the passive electrode 26 of the power reception apparatus, instead of the resistance coupling, unlike the power transmission apparatus and the power reception apparatus in FIG. 3. The active electrode 12 of the power transmission apparatus 101 can be capacitively coupled to the active electrode 24 of the power reception apparatus 201 and the passive electrode 13 of the power transmission apparatus 101 can be capacitively coupled to the passive electrode 26 of the power reception apparatus 201 to transmit the power from the power transmission apparatus 101 to the power reception apparatus 201.

A voltage generating circuit is connected between the two electrodes at the power transmission apparatus side, although not shown. Among the two electrodes, the electrode at a side at which a relatively high voltage is generated is called the active electrode at the power transmission apparatus side, and the electrode at a side at which a relatively low voltage is generated is called the passive electrode at the power transmission apparatus side. A load circuit is connected between the two electrodes at the power reception apparatus side. Among the two electrodes, the electrode at a side at which a relatively high voltage is generated is called the active electrode at the power reception apparatus side, and the electrode at a side at which a relatively low voltage is generated is called the passive electrode at the power reception apparatus side. The area of passive electrode 13 is larger than that of the active electrode 12 and the passive electrode 13 has, for example, a rectangular shape.

In the power reception apparatus 201, the passive electrode 26 is provided along the front face of the power reception apparatus 201. In this case, the passive electrode 26 is provided in parallel to the active electrode 24 provided at the rear face side of the power reception apparatus 201. The size of the passive electrode 26 is larger than that of the active electrode 24 and the passive electrode 26 has, for example, a rectangular shape. The passive electrode 26 is provided so as to oppose the passive electrode 13 at the power transmission apparatus 101 side.

FIG. 15A shows the power transmission apparatus 101 and FIG. 15B shows the power reception apparatus 201. When the power reception apparatus 201 is placed on the power transmission apparatus 101, the active electrode 12 of the power transmission apparatus in FIG. 15A is close to the active electrode 24 of the power reception apparatus in FIG. 15B via a gap. A passive electrode 14 of the power transmission apparatus 101 in FIG. 15A is close to any of passive electrodes 271, 272, and 273 of the power reception apparatus 201 in FIG. 15B via a gap. The active electrode 12 of the power transmission apparatus is capacitively coupled to the active electrode 24 of the power reception apparatus in FIG. 15B, as in FIG. 3.

The passive electrode 14 of the power transmission apparatus 101 in FIG. 15A is capacitively coupled to each of the passive electrodes 271, 272, and 273 of the power reception apparatus 201 in FIG. 15B, instead of the resistance coupling, unlike the power transmission apparatus and the power reception apparatus in FIG. 3.

A voltage generating circuit is connected between the active electrode at the power transmission apparatus side and the passive electrode at the power transmission apparatus side. A load circuit is connected between the active electrode at the power reception apparatus side and the passive electrodes at the power reception apparatus side. The active electrode of the power transmission apparatus can be capacitively coupled to the active electrode of the power reception apparatus and the passive electrode of the power transmission apparatus can be capacitively coupled to the passive electrode of the power reception apparatus to transmit the power from the power transmission apparatus to the power reception apparatus.

The passive electrode 14 of the power transmission apparatus 101 has a rectangular shape and is provided toward the holding face 10A, compared with the active electrode 12. The longitudinal direction of the passive electrode 14 coincides with the width direction of the power transmission apparatus 101. In addition, the passive electrode 14 is provided such that the long side toward the holding face 10A is apart from the holding face 10A by a distance D (D<L).

The passive electrodes 271, 272, and 273 of the power reception apparatus 201 each have the same length as that of, for example, the active electrode 24 and each have the same width as that of the passive electrode 14.

The passive electrode 271 is provided such that the longitudinal direction thereof coincides with the width direction of the casing of the power reception apparatus 201 and the passive electrode 271 is positioned in the center in the width direction of the casing. The long side of the passive electrode 271 toward the bottom face side of the casing is provided so as to be apart from the bottom face of the casing by the distance D.

The passive electrodes 272 and 273 are each provided such that the longitudinal direction thereof coincides with the height direction of the power reception apparatus 201. The passive electrodes 272 and 273 are each provided at the same position as that of the active electrode 24 in the height direction. In addition, the passive electrodes 272 and 273 are provided symmetrically to each other in the width direction of the casing. The long side of the passive electrode 272 at the side face side of the casing and the long side of the passive electrode 273 at the side face side of the casing are provided so as to be apart from the corresponding side faces of the casing by the distance D.

With the above configuration, the passive electrode 14 is capacitively coupled to the passive electrodes 271, 272, and 273 via the gap regardless of the longitudinal placement or the lateral placement of the power reception apparatus 201 on the power transmission apparatus 101.

The shapes and the sizes of the passive electrodes arranged on the same plane as that of the active electrodes may be appropriately varied in the power transmission apparatus 101 and the power reception apparatus 201.

Figure 16:
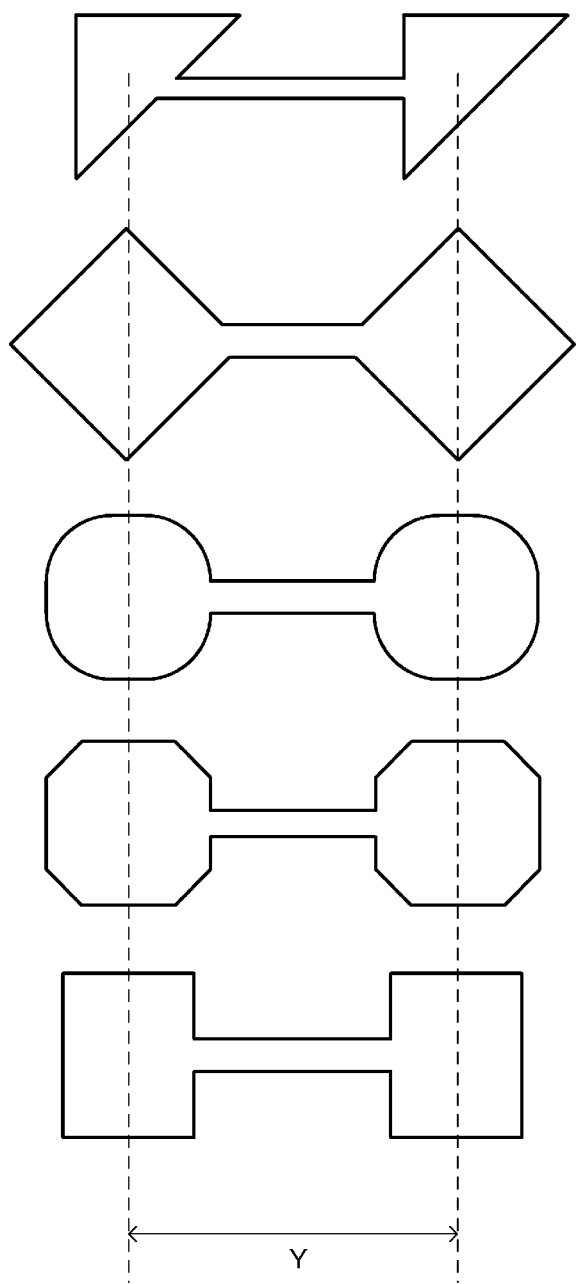
FIG. 16 is a diagram showing modifications of the active electrode of the power reception apparatus.

FIG. 16 is a diagram showing modifications of the active electrode of the power reception apparatus 201. Five modifications are shown in FIG. 16. Referring to FIG. 16, Y is equal to the length Y of the long side of the active electrode 12 of the power transmission apparatus 101 and indicates the distance between the center parts of the two electrodes composing the active electrode 24. It is preferred that the active electrode 24 have two electrodes and the sum of the facing areas between the respective electrodes and the active electrode 12 when the active electrode 24 opposes the active electrode 12 be substantially equal to the area of one electrode of the active electrode 24. For example, as shown in the modifications from the top to the bottom in FIG. 16, the active electrode 24 may have a configuration in which two triangles are arranged so as to be in the same orientation or a configuration in which two rhombuses are arranged. Alternatively, the active electrode 24 may have a configuration in which two square electrodes with rounded corners are arranged, a configuration in which two square electrodes with chamfered corners are arranged, or a configuration in which two rectangular electrodes having long sides and short sides are arranged.

Figure 17:
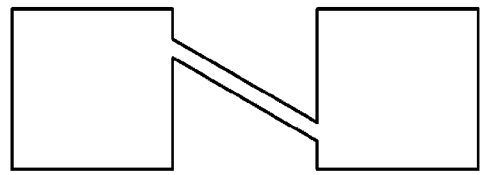
FIG. 17 is a diagram showing modifications of a linear electrode.
Figure 17:
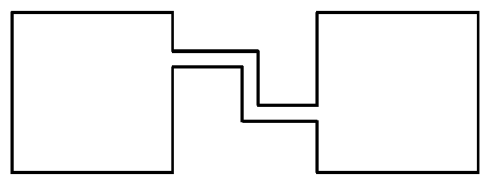
Figure 17:
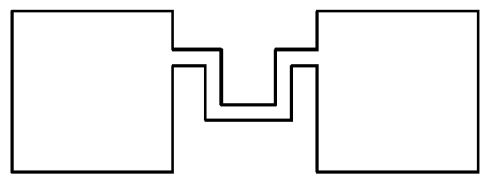

In addition, the linear electrode connecting the two square electrodes 241 and 242 composing the active electrode of the power reception apparatus 201 may not be linear. FIG. 17 is a diagram showing modifications of the linear electrode. As shown in the modifications from the top to the bottom in FIG. 17, the linear electrode may have a shape obliquely extending with respect to the two square electrodes 241 and 242 or a shape in which the linear electrode is bent in a central portion. Alternatively, the linear electrode may be U-shaped with substantially 90-degree corners.

Second Embodiment

A second embodiment will herein be described. In the first embodiment, the stable power transmission can be achieved even if the power reception apparatus 201 is shifted in the width direction of the power transmission apparatus 101. In contrast, in the present embodiment, the power transmission is stopped if a mounting allowable range of the power reception apparatus 201 in the width direction of the power transmission apparatus 101 (a mounting range of the power reception apparatus 101 in which the stable power transmission is achieved) is exceeded. In addition, it is possible for a user to perceive that the mounting allowable range is exceeded.

Figure 18:
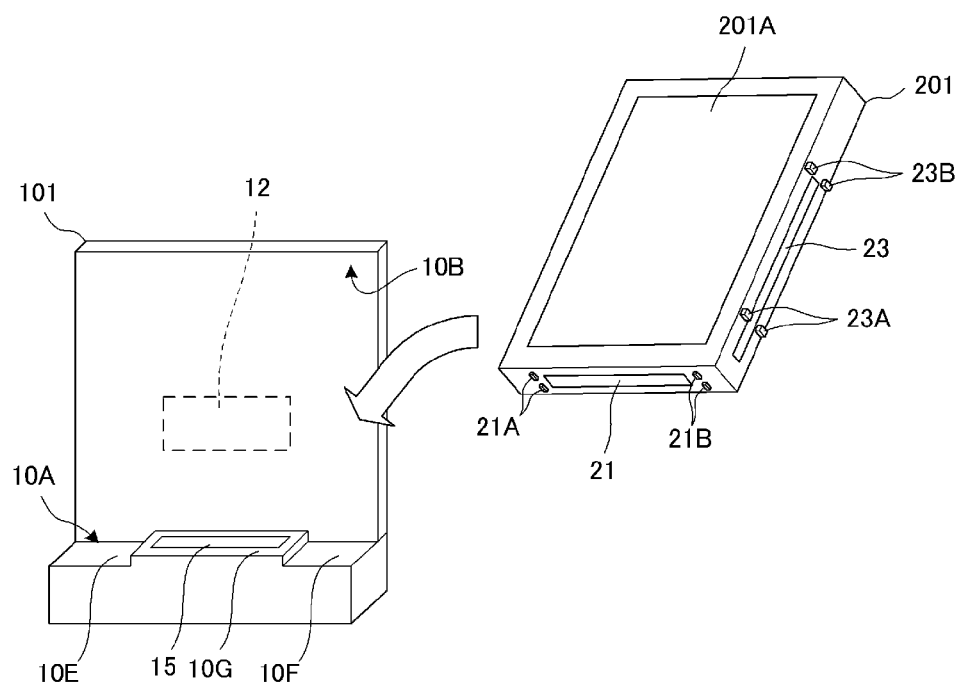
FIG. 18 is a perspective view showing a power transmission apparatus and a power reception apparatus according to a second embodiment.

FIG. 18 is a perspective view showing the power transmission apparatus 101 and the power reception apparatus 201 according to the second embodiment. Protrusion parts 21A and 21B are provided on the bottom face of the casing of the power reception apparatus 201 on which the passive electrode 21 is provided. The protrusion parts 21A and 21B each have a pair of protrusions and each protrusion has a rectangular parallelepiped shape. The protrusion parts 21A and 21B are provided such that the longitudinal direction thereof is orthogonal to the longitudinal direction of the passive electrode 21 and such that the passive electrode 21 is sandwiched between the protrusion parts 21A and 21B.

Two recesses 10E and 10F are provided on the holding face 10A of the power transmission apparatus 101 on which the power reception apparatus 201 is to be placed. A passive electrode 15 of the power transmission apparatus 101 is arranged in a part (hereinafter referred to as a protruded part) 10G between the recesses 10E and 10F of the holding face 10A. The protrusion parts 21A and 21B are positioned in the recesses 10E and 10F when the power reception apparatus 201 is placed on the power transmission apparatus 101, and the protrusion parts 21A and 21B abut against the side walls of the protruded part 10G when the power reception apparatus 201 is moved in the width direction of the power transmission apparatus 101. Accordingly, it is possible to detect the mounting allowable range of the power reception apparatus 201. The difference between the distance between the protrusion parts 21A and 21B and the distance between the recesses 10E and 10F corresponds to the movable range.

Protrusion parts 23A and 23B are provided on the side face of the casing of the power reception apparatus 201 on which the passive electrode 23 is provided. The protrusion part 23A has a pair of protrusions and each protrusion has a substantially rectangular parallelepiped shape. These two protrusions are arranged along the direction orthogonal to the longitudinal direction of the passive electrode 23 and are provided such that the passive electrode 23 is sandwiched between the two protrusions. Similarly to the protrusion part 23A, the protrusion part 23B has a pair of protrusions that are arranged along the direction orthogonal to the longitudinal direction of the passive electrode 23 and that are provided such that the passive electrode 23 is sandwiched between the two protrusions. Protrusion parts similar to the protrusion parts 23A and 23B are provided on the side face of the casing of the power reception apparatus 201, on which the passive electrode 22 is provided, although not shown.

The passive electrode 15 of the power transmission apparatus 101 has a plate shape and is provided in the protruded part 10G of the holding face 10A. The recesses 10E and 10F at both sides of the protruded part 10G engage with the protrusion parts 21A and 21B or the protrusion parts 23A and 23B. The height of the protruded part 10G is the same as or higher than that of the protrusion parts 21A and 21B and the protrusion parts 23A and 23B of the power reception apparatus 201. The length of the passive electrode 15 is shorter than the distance between the protrusion parts 21A and 21B and the distance between the protrusion parts 23A and 23B. Accordingly, when the power reception apparatus 201 is placed on the holding face 10A of the power transmission apparatus 101, the passive electrode 15 provided in the protruded part 10G of the power transmission apparatus 101 directly conducts to the passive electrode 21 or 23 of the power reception apparatus 201. The passive electrode 15 may be provided in the entire surface of the protruded part 10G in FIG. 18. The protruded part 10G may be composed of the passive electrode 15 formed of a metal flat plate in FIG. 18.

The distance between the protrusion parts 21A and 21B, the distance between the protrusion parts 23A and 23B, and the length of the protruded part 10G will now be described. It is assumed in the present embodiment that the active electrode 12 of the power transmission apparatus 101 has the configuration described above with reference to FIG. 6 and the active electrode 24 of the power reception apparatus 201 has the configuration described above with reference to FIG. 7.

Figure 19:
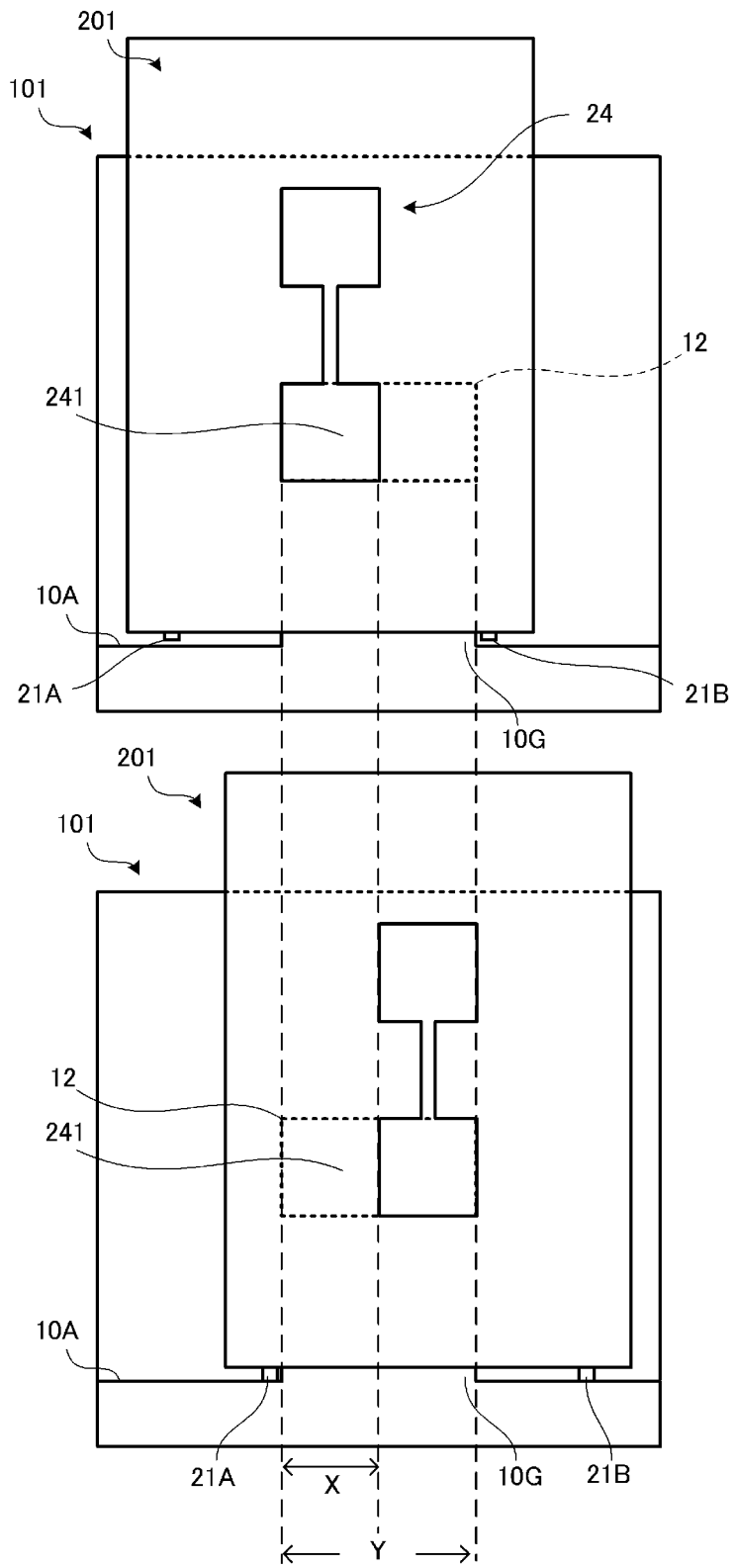
FIG. 19 is a schematic diagram for describing the length of a protruded part of the power transmission apparatus and the distance between protrusion parts of the power reception apparatus.

FIG. 19 is a schematic diagram for describing the length of the protruded part 10G of the power transmission apparatus 101 and the distance between the protrusion parts 21A and 21B of the power reception apparatus 201. FIG. 19 shows a state in which the power reception apparatus 201 is mounted with being shifted at a maximum in the width direction of the power transmission apparatus 101 within the mounting allowable range.

The protruded part 10G of the power transmission apparatus 101 is provided such that the center thereof coincides with the center of the power transmission apparatus 101 in the width direction. In addition, the protruded part 10G is provided so as to have the same height as that of the protrusion parts 21A and 21B of the power reception apparatus 201 or so as to be higher than that of the protrusion parts 21A and 21B of the power reception apparatus 201. With this configuration, it is possible to move the power reception apparatus 201 in the width direction of the power transmission apparatus 101 with the passive electrodes that is conducting to each other.

It is desirable that the difference between the distance (first distance) between the protrusion parts 21A and 21B of the power reception apparatus 201 and the length of the protruded part 10G of the power transmission apparatus 101 (the distance between the recesses 10E and 10F) (second distance) be set to (Y−X). In other words, it is possible to move the power reception apparatus 201 in the width direction of the power transmission apparatus 101 within the movable range corresponding to the difference (Y−X). Limiting the movable range to (Y−X) allows the facing area between the entire square electrode 241 and the active electrode 12 to be constant.

As described above with reference to FIG. 8A and FIG. 8B in the first embodiment, when the power reception apparatus 201 is longitudinally placed in the center of the power transmission apparatus 101, the entire square electrode 241 of the active electrode 24 opposes the active electrode 12. Even when the power reception apparatus 201 is shifted in the width direction of the power transmission apparatus 101 by the length (Y−X)/2, the facing area is not varied because the entire square electrode 241 opposes the active electrode 12. As a result, the stable power transmission is performed even if the power reception apparatus 201 is mounted with being shifted in the width direction of the power transmission apparatus 101.

Figure 20A:
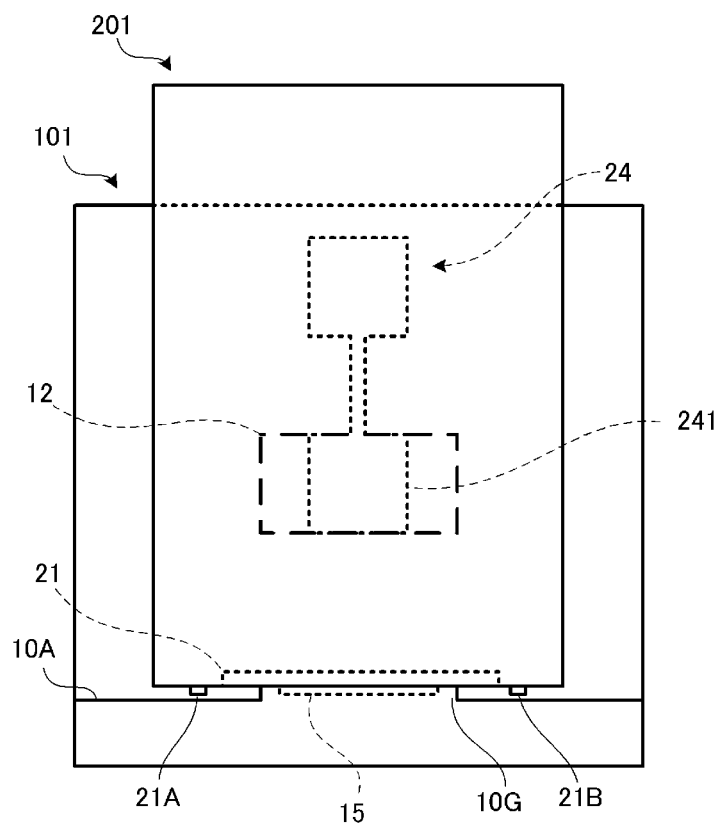
FIG. 20A is a front view when the power reception apparatus is longitudinally placed in the center of the power transmission apparatus.
Figure 20B:
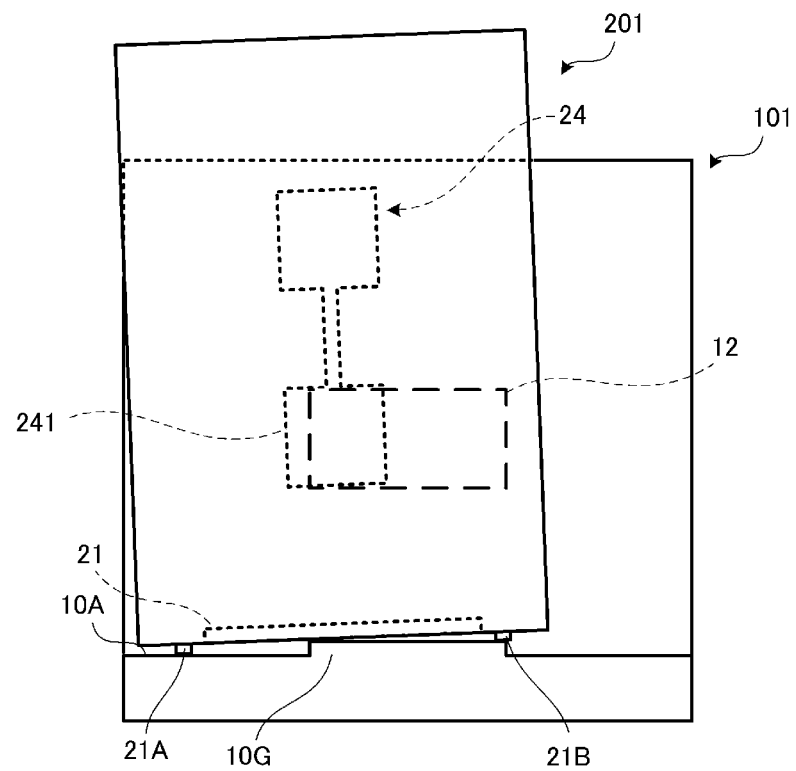
FIG. 20B is a front view when the power reception apparatus is longitudinally placed on the power transmission apparatus over a mounting allowable range.

FIG. 20A is a front view when the power reception apparatus 201 is longitudinally placed in the center of the power transmission apparatus 101. FIG. 20B is a front view when the power reception apparatus 201 is longitudinally placed on the power transmission apparatus 101 over the mounting allowable range.

When the power reception apparatus 201 is longitudinally placed in the center of the power transmission apparatus 101, as in FIG. 20A, the protruded part 10G of the power transmission apparatus 101 is positioned between the protrusion parts 21A and 21B and directly conducts to the passive electrode 21 of the power reception apparatus 201. Accordingly, the power is stably transmitted from the power transmission apparatus 101 to the power reception apparatus 201. In this case, there is an allowance corresponding to the length (Y−X)/2 between each of the protrusion parts 21A and 21B and the protruded part 10G. Accordingly, even if the power reception apparatus 201 is moved in the width direction of the power transmission apparatus 101 by (Y−X)/2, the facing area between the square electrode 241 of the active electrode 24 and the active electrode 12 is not varied and the protrusion part 21A or 21B does not run on the protruded part 10G.

In contrast, when the power reception apparatus 201 is moved in the width direction of the power transmission apparatus 101 over the mounting allowable range, as shown in FIG. 20B, that is, when the facing area between the square electrode 241 of the active electrode 24 and the active electrode 12 is varied (is made smaller), the power transmission is not performed because the protrusion part 21A or 21B runs on the protruded part 10G and the passive electrode 21 does not conduct to the passive electrode 15 on the protruded part 10G. When the facing area between the active electrode 12 of the power transmission apparatus 101 and the active electrode 24 of the power reception apparatus 201 is made small to reduce the transmitted power as in the above case, the passive electrode 21 can be made non-conductive to the passive electrode 15 on the protruded part 10G to stop the power transmission. In addition, since the user has a feeling of strangeness for the protrusion parts 21A and 21B, the user determines that the power reception apparatus 201 is over the allowable mounting position of the power reception apparatus 201.

Figure 21:
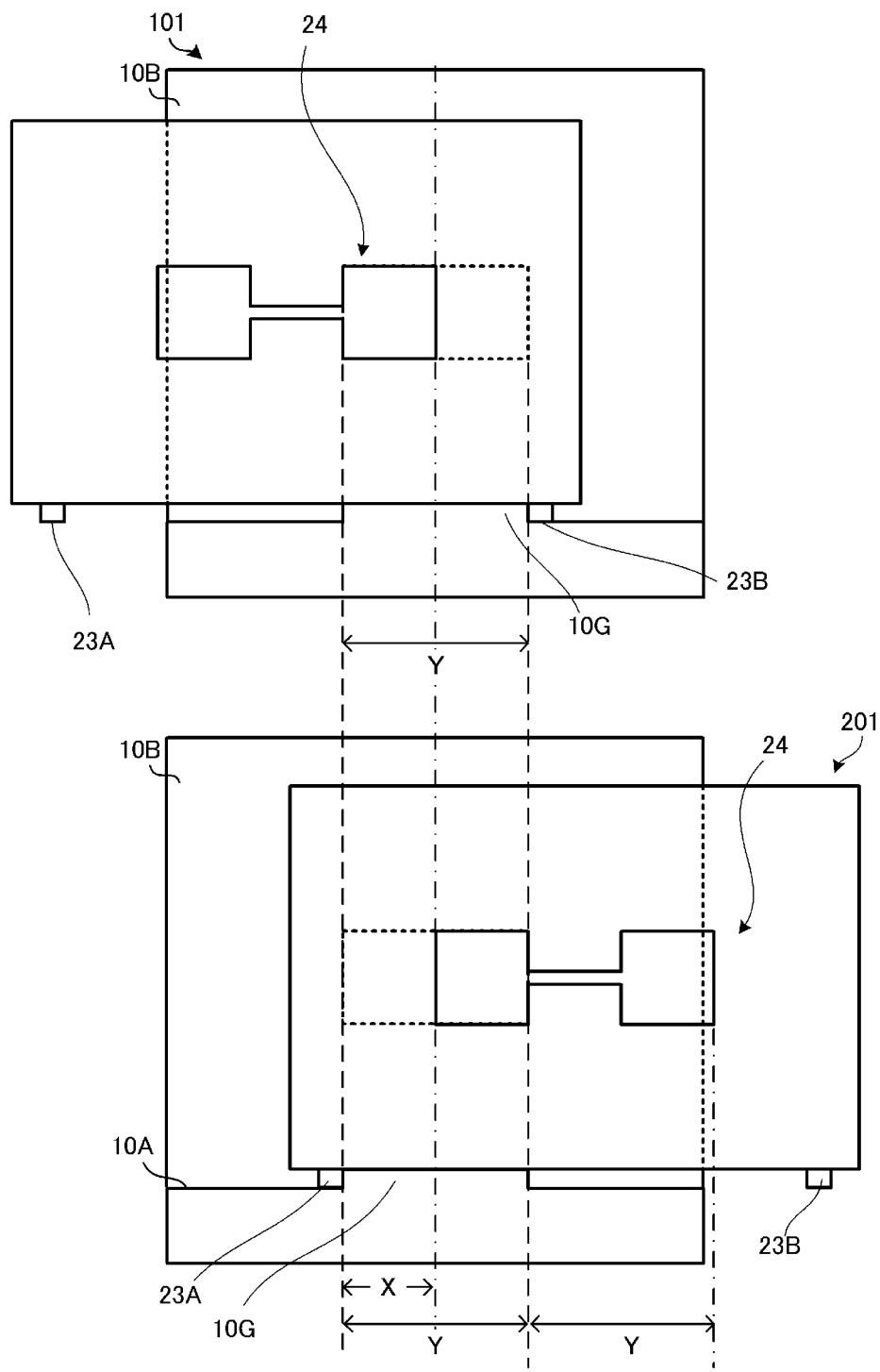
FIG. 21 is a schematic diagram for describing the length of the passive electrodes of the power transmission apparatus and the distance between the protrusion parts of the power reception apparatus.

FIG. 21 is a schematic diagram for describing the length of the protruded part 10G of the power transmission apparatus 101 and the distance between the protrusion parts 23A and 23B of the power reception apparatus 201. It is desirable that the difference between the distance between the protrusion parts 23A and 23B of the power reception apparatus 201 and the length of the protruded part 10G of the power transmission apparatus 101 (the distance between the recesses 10E and 10F) be set to (2Y−X). In other words, it is possible to move the power reception apparatus 201 in the width direction of the power transmission apparatus 101 within the movable range corresponding to the difference (2Y−X). Limiting the movable range to (2Y−X) allows the facing area between the entire square electrode 241 and the active electrode 12 to be constant.

In this case, when the power reception apparatus 201 is laterally placed in the center of the power transmission apparatus 101 (not shown), the protruded part 10G of the power transmission apparatus 101 is positioned between the protrusion parts 23A and 23B and the passive electrode 15 directly conducts to the passive electrode 23 of the power reception apparatus 201. Accordingly, the power is stably transmitted from the power transmission apparatus 101 to the power reception apparatus 201. In this case, there is an allowance corresponding to the length (2Y−X)/2 between each of the protrusion parts 23A and 23B and the protruded part 10G. Accordingly, if the power reception apparatus 201 is moved in the width direction of the power transmission apparatus 101 by a distance longer than (2Y−X)/2, the protrusion part 23A or 23B runs on the protruded part 10G. As a result, since the passive electrode 21 or the passive electrode 23 does not conduct to the passive electrode 15, the power transmission is not performed. In addition, since the user has a feeling of strangeness for the protrusion parts 23A and 23B, the user determines that the power reception apparatus 201 is over the allowable mounting position of the power reception apparatus 201.

The protrusion parts 21A and 21B or the protrusion parts 23A and 23B may be provided at the power transmission apparatus 101 side, and a protrusion part on which the protrusion part 21A or 21B is to run and which corresponds to the protruded part 10G may be provided at the power reception apparatus 201 side. Although the protrusion parts are provided on the bottom face and the side faces of the casing of the power reception apparatus 201 on which the passive electrodes 21 and 23 are provided in the present embodiment, only one face has the protrusion part provided thereon. Only one of the protrusion parts 21A and 21B may be provided and only one of the protrusion parts 23A and 23B may be provided.

Figure 22:
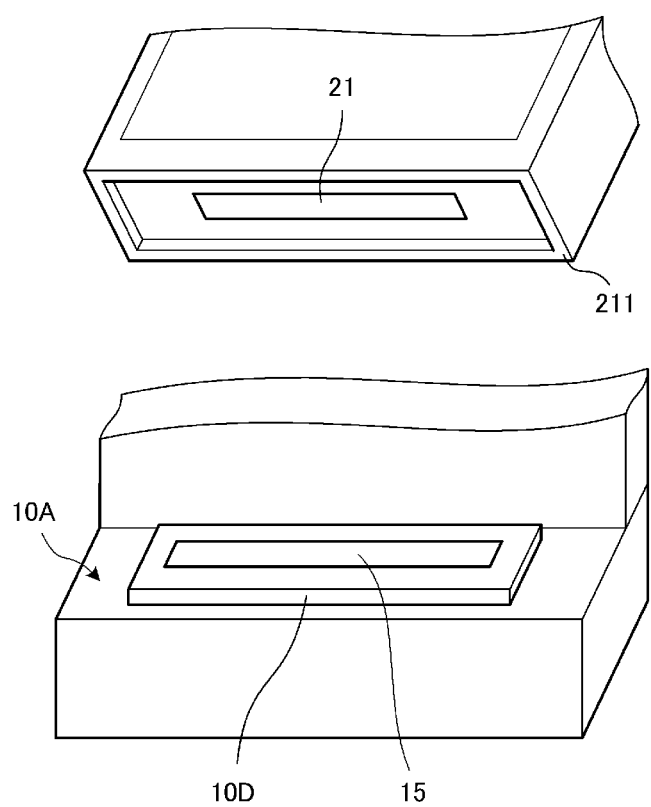
FIG. 22 is a diagram showing a modification of the configuration allowing the power reception apparatus to be reliably mounted within the mounting allowable range.

The configuration allowing the power reception apparatus 201 to be reliably mounted within the mounting allowable range is not limited to the shapes in the above embodiment, the distance between the protrusion parts 21A and 21B or the protrusion parts 23A and 23B, and the length of the protruded part 10G and may be appropriately varied. In other words, the mounting allowable range may be expanded from the above range or may be narrowed down. FIG. 22 is a diagram showing a modification of the configuration allowing the power reception apparatus 201 to be reliably mounted within the mounting allowable range. The bottom face of the casing of the power reception apparatus 201 on which the passive electrode 21 is provided and the holding face 10A of the power transmission apparatus 101 are shown in FIG. 22 and the other components are omitted in FIG. 22.

As shown in FIG. 22, a configuration may be adopted in which a protruded wall 211 surrounding the passive electrode 21 is formed on the bottom face of the casing of the power reception apparatus 201, the holding face 10A of the power transmission apparatus 101 is raised, and a protrusion part 10D enters the inside of the protruded wall 211 when the power reception apparatus 201 is mounted. In this case, the passive electrode 15 is provided in the protrusion part 10D. The length of the protrusion part 10D in the width direction of the power transmission apparatus 101 corresponds to the length by which the protruded wall 211 runs on the protrusion part 10D when the power reception apparatus 201 is mounted over the mounting allowable range.

The passive electrode may be provided in the entire surface of the protrusion part 10C or 10D in FIG. 22.

Even if the passive electrodes shown in FIG. 14 are capacitively coupled to each other, it is possible to provide the protrusion parts 21A and 21B and so on. In this case, for example, a protrusion part or the like on which the protrusion part 21A or 21B is to run is provided on the holding face 10A. If the protrusion part 21A or 21B runs on the protrusion part when the power reception apparatus 201 is over the mounting allowable range, the passive electrodes can be prevented from being opposed to each other not to cause the capacitive coupling, thereby stopping the power transmission.

REFERENCE SIGNS LIST 10A holding face
10B backrest face
11 passive electrode (third electrode)
12 active electrode (first electrode)
21, 22, 23 passive electrode (fourth electrode)
24 active electrode (second electrode)
101 power transmission apparatus
201 power reception apparatus

The invention claimed is:

1. A wireless power transmission system comprising:
a power transmission apparatus including a first electrode and a voltage generating circuit connected to the first electrode; and
a power reception apparatus including a second electrode, a voltage step-down circuit connected to the second electrode, and a load circuit that receives a voltage output from the voltage step-down circuit as a source voltage,
wherein, when the power reception apparatus is placed on the power transmission apparatus in a first state where the first electrode opposes the second electrode, electric power is transmitted from the power transmission apparatus to the power reception apparatus, and
wherein a second facing area between the first electrode and the second electrode when the power reception apparatus is placed on the power transmission apparatus in a second state in which the power reception apparatus is turned by substantially 90 degrees from the first state is substantially equal to a first facing area therebetween when the power reception apparatus is placed on the power transmission apparatus in the first state.

2. The wireless power transmission system according to claim 1,
wherein one of the first electrode and the second electrode includes a strip electrode having a first axis and a second axis shorter than the first axis,
wherein a second of the first electrode and the second electrode includes two electrodes whose central portions are aligned so as to be spaced from each other by a length of the first axis and a connection part connecting the two electrodes, and
wherein the two electrodes each have a shape in which a sum of the facing areas between the respective two electrodes and the strip electrode when the alignment direction coincides with the direction of the first axis is substantially equal to an area of one of the two electrodes.

3. The wireless power transmission system according to claim 2,
  wherein the strip electrode has a rectangular, and
  wherein the two electrodes have a square shape with sides of a length equal to that of shortest sides of the strip electrode and are aligned such that the opposing side of one of the two electrodes is parallel to the opposing side of the other of the two electrodes.

4. The wireless power transmission system according to claim 2,
  wherein the strip electrode has a rectangular,
  wherein the two electrodes include a rectangular electrode with sides of a length equal to a length of shortest sides and a square electrode whose side is shorter than each side of the rectangular electrode, and
  wherein the square electrode is aligned with the rectangular electrode such that the opposing side of the square electrode is parallel to the opposing side of the rectangular electrode.

5. The wireless power transmission system according to claim 4, wherein the sides along an alignment direction of the rectangular electrode have a length within a range from 1.1 to 1.25 times the length of each side of the square electrode.

6. The wireless power transmission system according to claim 2,
  wherein the power transmission apparatus includes a holding face on which the power reception apparatus is to be placed and a backrest face that supports the power reception apparatus placed on the holding face and that is perpendicular to the holding face,
  wherein the first electrode has a rectangular shape and is provided along the backrest face such that a longitudinal direction of the first electrode is parallel to the holding face, a first side of the first electrode toward the holding face is spaced from the holding face by a distance L, and
  wherein the power reception apparatus has a rectangular support face configured to contact the backrest face and be supported by the backrest face when the power reception apparatus is placed on the holding face and, when the power reception apparatus is placed on the power transmission apparatus such that a side of the support face is parallel to the holding face, the second electrode is parallel to the holding face such that the two electrodes are aligned in parallel to the side of the support face and respective sides of the two electrodes toward the holding face are apart from the holding face by the distance L.

7. The wireless power transmission system according to claim 6, wherein, when the power reception apparatus is placed on the power transmission apparatus such that a direction in which the side of the support face extends is perpendicular to the holding face, the second electrode is provided along a direction perpendicular to the holding face such that the two electrode are aligned in the direction of the side of the support face and, among the two electrodes, one side of one of the two electrodes toward the holding face is apart from the holding face by a distance L.

8. The wireless power transmission system according to claim 7, wherein the rectangular electrode of the two electrodes is positioned at the side of the holding face.

9. The wireless power transmission system according to claim 6,
  wherein the power transmission apparatus includes a third electrode that is provided along the holding face such that a voltage can be applied between the third electrode and the first electrode by the voltage generating circuit,
  wherein the power reception apparatus includes fourth electrodes that are provided along at least two opposing side faces among four sides thereof adjacent to the support face, the voltage step-down circuit being connected between the fourth electrodes and the second electrode, and
  wherein, when the power reception apparatus is placed on the power transmission apparatus, the third electrode directly conducts to the fourth electrodes.

10. The wireless power transmission system according to claim 9, wherein a length of the two side faces having the fourth electrodes of the power reception apparatus is longer than that of the holding face.

11. The wireless power transmission system according to claim 6,
  wherein the power transmission apparatus includes a rectangular third electrode provided along the backrest face such that the longitudinal direction of the third electrode is parallel to the holding face and a long side of which extending toward the holding face is apart from the holding face by a distance D, a voltage being applied between the third electrode and the first electrode by the voltage generating circuit,
  wherein the power reception apparatus includes a rectangular fourth electrode provided along the support face such that a longitudinal direction of the fourth electrode is parallel to the holding face and a long side of which extending toward the holding face is apart from the holding face by the distance D (D<L), the voltage step-down circuit being connected between the fourth electrode and the second electrode, and
  wherein, when the power reception apparatus is placed on the power transmission apparatus, the third electrode is sufficiently close to the fourth electrode to be electrically coupled thereto.

12. The wireless power transmission system according to claim 6,
  wherein the power transmission apparatus includes a third electrode opposing the first electrode, a voltage being applied between the third electrode and the first electrode by the voltage generating circuit,
  wherein the power reception apparatus includes a fourth electrode opposing the second electrode, the voltage step-down circuit being connected between the fourth electrode and the second electrode, and
  wherein, when the power reception apparatus is placed on the power transmission apparatus, the third electrode is capacitively coupled to the fourth electrode with the first electrode and the second electrode sandwiched therebetween.

13. The wireless power transmission system according to claim 1, wherein the power transmission apparatus and the power reception apparatus each include an engagement part, the engagement part of the power transmission apparatus engaging with the engagement part of the power reception apparatus when the power reception apparatus is moved over an allowable range from the facing area between the first electrode or the second electrode in the first state or the second state.

14. The wireless power transmission system according to claim 13,
  wherein the power transmission apparatus and the power reception apparatus each include a plane, the plane of the power transmission apparatus being in contact with the plane of the power reception apparatus when the power reception apparatus is placed on the power transmission apparatus,
  wherein the engagement part of one of the power transmission apparatus and the power reception apparatus includes two protrusion parts that protrude toward the other of the power transmission apparatus and the power reception apparatus and that are provided on the plane so as to be apart from each other by a first distance, and wherein the engagement part of the other of the power transmission apparatus and the power reception apparatus includes two recesses that are engaged with the two protrusion parts and that are provided on the plane so as to be apart from each other by a second distance shorter than the first distance.

15. The wireless power transmission system according to claim 14, wherein the strip electrode has a rectangular shape having short sides of a length X and long sides of a length Y, wherein the two electrodes have a square shape with sides of the length X and are aligned along a longitudinal direction of the strip electrode so as to be apart from each other by a distance (Y−X), wherein the two protrusion parts and the two recesses are provided along the longitudinal direction, and wherein a difference between the distance between the two protrusion parts and the distance between the two recesses is equal to (2Y−X).

16. The wireless power transmission system according to claim 14, wherein the strip electrode has a rectangular shape having short sides of a length X and long sides of a length Y, wherein the two electrodes have a square shape with sides of the length X and are aligned along a direction orthogonal to a longitudinal direction of the strip electrode so as to be apart from each other by a distance (Y−X), wherein the two protrusion parts are provided along the direction orthogonal to the longitudinal direction, wherein the two recesses are provided along the orthogonal direction, and wherein a difference between the distance between the two protrusion parts and the distance between the two recesses is equal to (Y−X).

17. The wireless power transmission system according to claim 14, wherein one of the third electrode and the fourth electrode is provided in a plane part between the two protrusion parts, and wherein a protruded part sandwiched between the two recesses is in contact with the plane part as a contact part and a second of the third electrode and the fourth electrode is provided at the contact part.

* * * * *